(12) United States Patent
Okuda et al.

(10) Patent No.: US 8,621,850 B2
(45) Date of Patent: Jan. 7, 2014

(54) EXHAUST GAS TREATMENT DEVICE FOR DIESEL ENGINE

(75) Inventors: Mitsugu Okuda, Sakai (JP); Toshio Nakahira, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 138 days.

(21) Appl. No.: 13/393,268

(22) PCT Filed: Aug. 3, 2010

(86) PCT No.: PCT/JP2010/063066
§ 371 (c)(1),
(2), (4) Date: Feb. 29, 2012

(87) PCT Pub. No.: WO2011/027639
PCT Pub. Date: Mar. 10, 2011

(65) Prior Publication Data
US 2012/0159937 A1    Jun. 28, 2012

(30) Foreign Application Priority Data
Sep. 2, 2009    (JP) ................................. 2009-202407

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |

(52) U.S. Cl.
USPC .................. 60/295; 60/286; 60/297; 60/311; 60/324; 239/106; 239/107; 239/108; 239/112

(58) Field of Classification Search
USPC ............ 60/286, 295, 297, 311, 324; 239/106, 239/107, 108, 112, 431, 434
See application file for complete search history.

(56) References Cited

U.S. PATENT DOCUMENTS

| 2007/0068146 A1* | 3/2007 | Rolffs et al. .................... 60/297 |
| 2007/0101698 A1* | 5/2007 | Goulette et al. ................ 60/284 |

(Continued)

FOREIGN PATENT DOCUMENTS

| JP | 2008-019796 A | 1/2008 |
| JP | 2008-215193 A | 9/2008 |

(Continued)

OTHER PUBLICATIONS

Int'l Search Report issued Oct. 12, 2010 in Int'l Application No. PCT/JP2010/063066.

*Primary Examiner* — Thomas Denion
*Assistant Examiner* — Dapinder Singh
(74) *Attorney, Agent, or Firm* — Panitch Schwarze Belisario & Nadel LLP

(57) ABSTRACT

An exhaust gas treatment device for a diesel engine is capable of smoothly starting the generation of a combustible gas and is provided with a small combustible gas generator. A core material is fitted in the center portion of an annular wall to form an air-fuel mixing chamber between the inner peripheral surface of the annular wall and the outer peripheral surface of the core material. An air-fuel mixture gas in the air-fuel mixing chamber is adapted to be supplied from the end of the air-fuel mixing chamber to a combustible gas generating catalyst to a portion near the center thereof. A heater is used as the core material, the heat dissipating outer peripheral surface of the heater is exposed to the air-fuel mixing chamber. Heat is dissipated directly from the heat dissipating outer peripheral surface of the heater to the air-fuel mixing chamber when starting the generation of the combustible gas.

14 Claims, 13 Drawing Sheets

(56) References Cited

U.S. PATENT DOCUMENTS

2008/0209890 A1* 9/2008 Cox et al. .................. 60/286
2008/0209895 A1* 9/2008 Miller et al. ................ 60/295

FOREIGN PATENT DOCUMENTS

| | | |
|---|---|---|
| JP | 2009-510323 A | 3/2009 |
| JP | 2009-074533 A | 4/2009 |

* cited by examiner

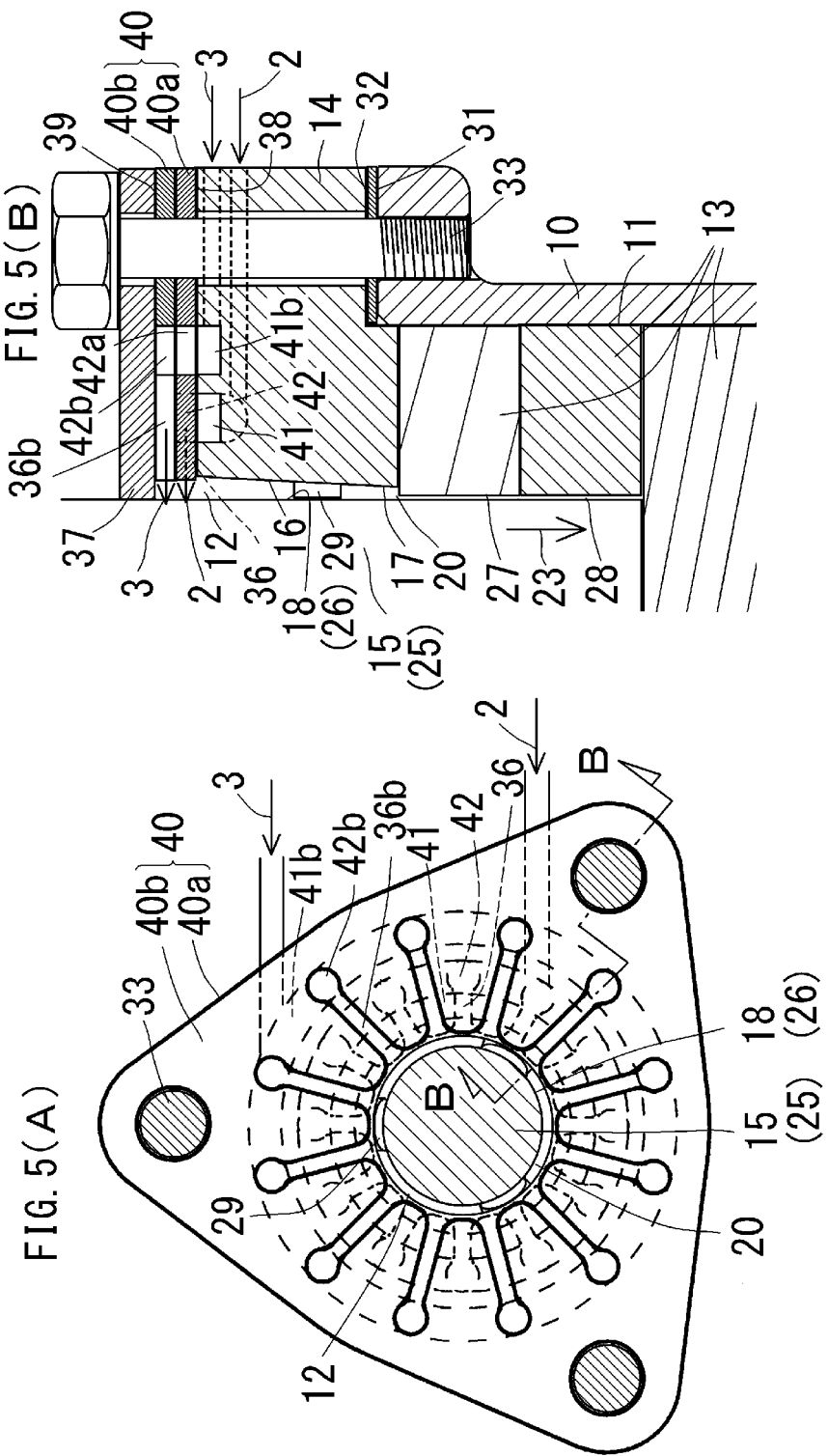

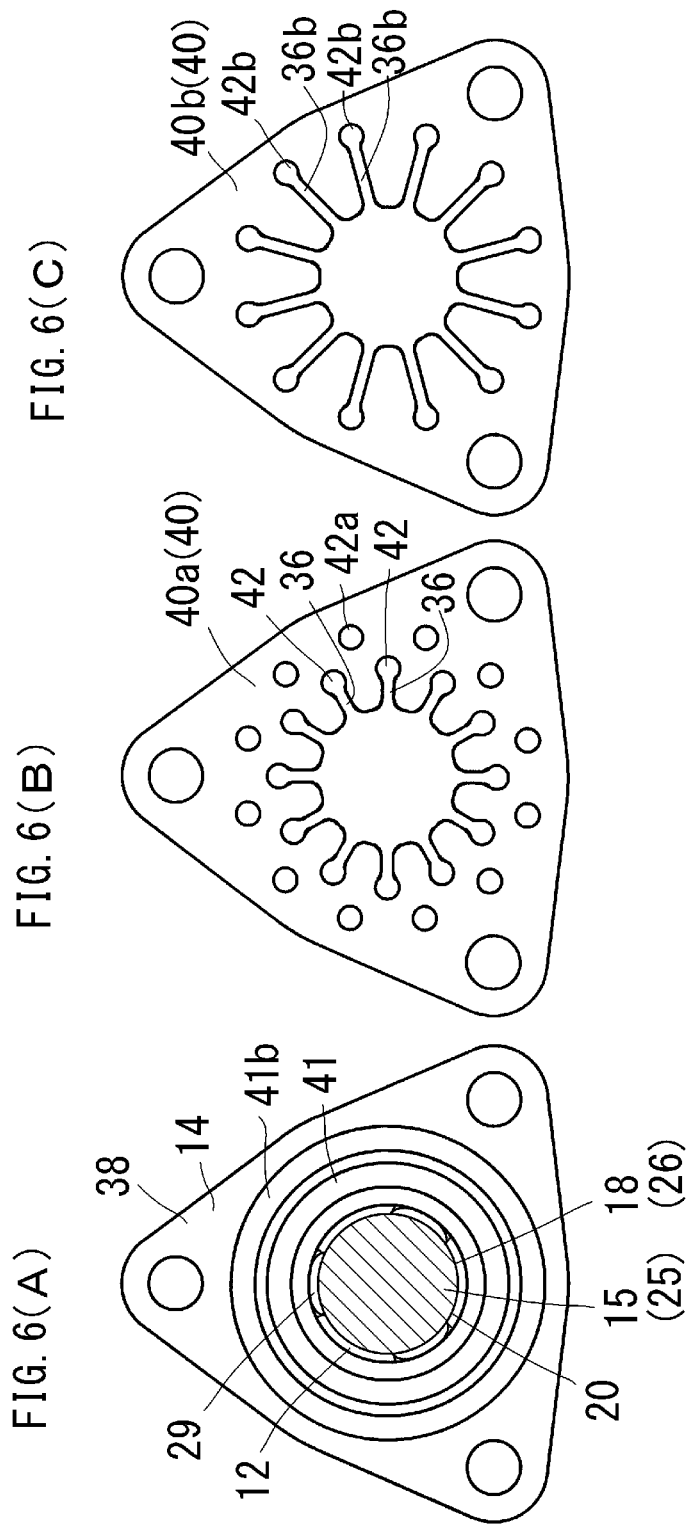

FIG. 7

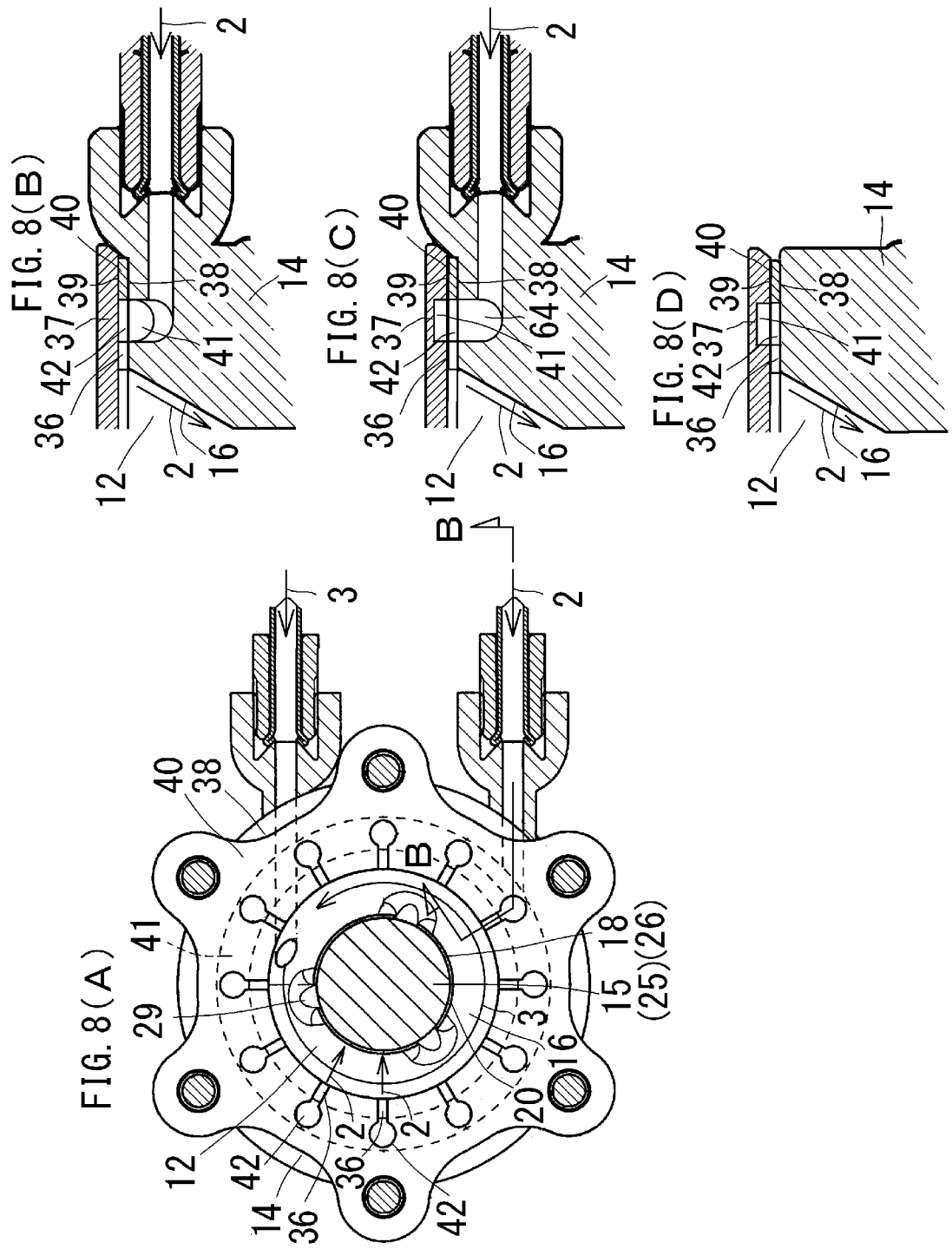

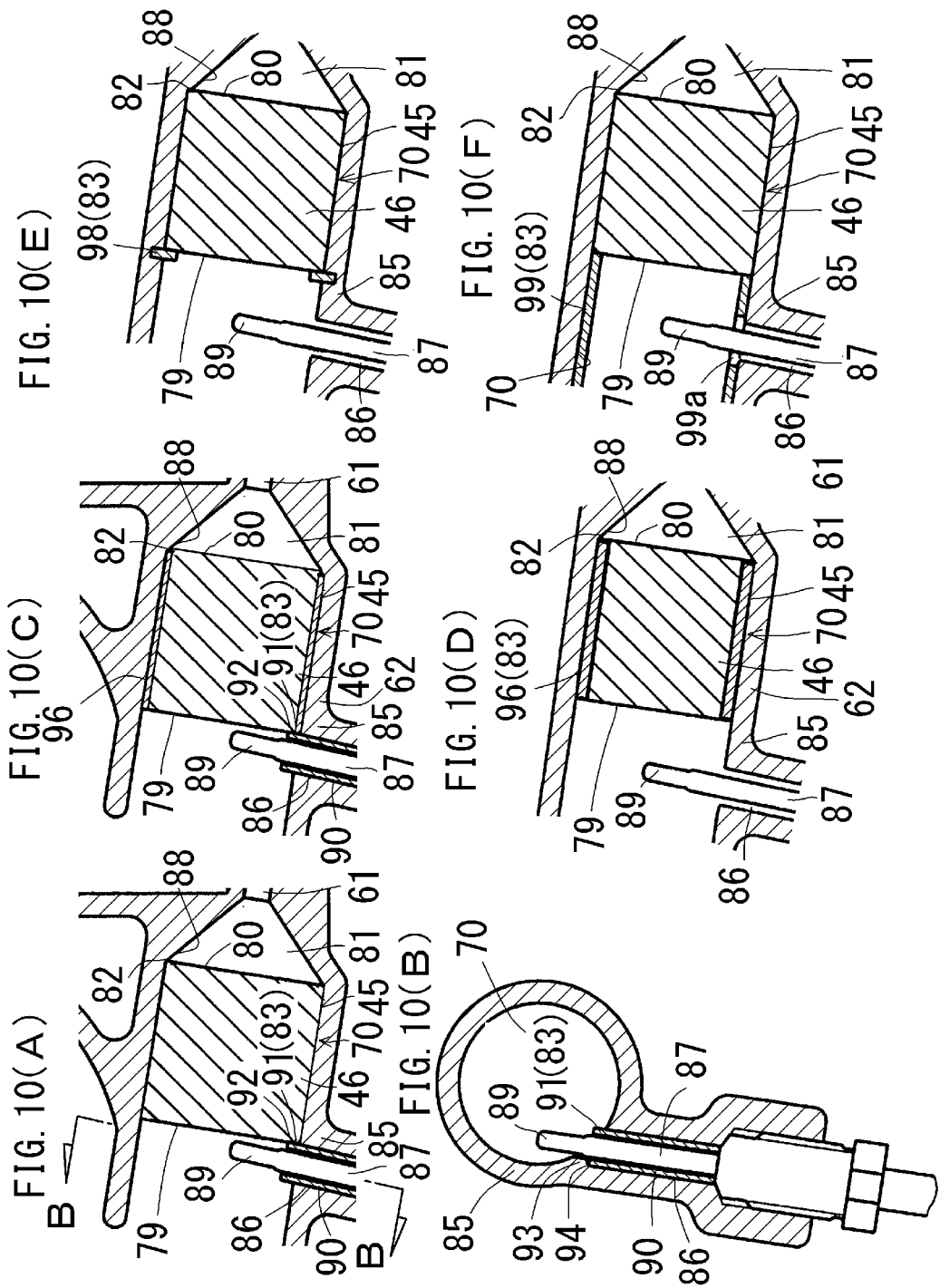

EXHAUST GAS TREATMENT DEVICE FOR DIESEL ENGINE

CROSS-REFERENCE TO RELATED APPLICATIONS

This application is a Section 371 of International Application No. PCT/JP2010/063066, filed Aug. 3, 2010, which was published in the Japanese language on Mar. 10, 2011, under International Publication No. WO 2011/027639 A1 and the disclosure of which is incorporated herein by reference.

BACKGROUND OF THE INVENTION

The present invention relates generally to an exhaust gas treatment device for a diesel engine and, more particularly, to an exhaust gas treatment device for a diesel engine, which can smoothly start the generation of a combustible gas and also reduce the size of a combustible gas generator.

From among the terms of this specification and claims, a "DPF" is an abbreviation of a diesel particulate filter, and a "PM" is an abbreviation of a particulate matter included in an exhaust gas.

There is a conventional device in which a combustible gas is generated by a combustible gas generator, the combustible gas is discharged from a combustible gas discharge port to an exhaust passage in the upper stream of a DPF, a temperature of an exhaust gas is raised by combustion heat generated by burning the combustible gas using oxygen in the exhaust gas, and a PM accumulated in the DPF is burnt and removed by the heat of the exhaust gas (refer to Patent Document 1 below).

This type of a device is advantageous in that the PM accumulated in the DPF can be burnt and removed by raising the temperature of the exhaust gas by using the combustible gas even when the temperature of the exhaust gas is low.

The conventional technology, however, is problematic in that a thermal conduction plate and the central wall of an air-fuel mixing chamber are interposed between the heat-dissipating outer peripheral surface of a heater and the air-fuel mixing chamber and thus heat is indirectly radiated from the heat-dissipating outer peripheral surface of the heater to the air-fuel mixing chamber sequentially through the thermal conduction plate and the central wall of the air-fuel mixing chamber when the generation of the combustible gas is started.

Patent Document 1: Japanese Unexamined Patent Publication No. 2008-19796.

There is the case in which the generation of a combustible gas is not smoothly started.

When the generation of a combustible gas is started, heat is indirectly radiated from the heat-dissipating outer peripheral surface of the heater to the air-fuel mixing chamber sequentially through the thermal conduction plate and the central wall of the air-fuel mixing chamber. Accordingly, it is difficult for the heat of the heater to be transferred to the air-fuel mixing chamber and the generation of the combustible gas may not be smoothly started because the formation of an air-fuel mixture gas is delayed.

There is the case in which the size of the combustible gas generator may be increased.

There is the case in which the size of the combustible gas generator is increased because the thermal conduction plate or the inner circumferential wall of the air-fuel mixing chamber is interposed between the heater and the air-fuel mixing chamber.

BRIEF SUMMARY OF THE INVENTION

An objective of a preferred embodiment of the present invention is to provide an exhaust gas treatment device for a diesel engine, which can smoothly start the generation of a combustible gas and also reduce the size of a combustible gas generator.

The characteristic of a preferred embodiment of the present invention is as follows.

As illustrated in FIG. 1, in the exhaust gas treatment device of a diesel engine in which a combustible gas 4 is generated by a combustible gas generator 1, the combustible gas 4 is discharged from a combustible gas discharge port 6 to an exhaust passage 7 in the upper stream of a DPF 5, the combustible gas 4 is burnt by oxygen within an exhaust gas 8, a temperature of the exhaust gas 8 is raised by the heat of the combustion, and a PM accumulated in the DPF 5 is burnt and removed by the heat of the exhaust gas 8, as illustrated in FIG. 2, a combustible gas generation catalyst chamber 11 is installed in the combustible gas generator 1, a combustible gas generation catalyst 13 is accommodated in the combustible gas generation catalyst chamber 11, a ring-shaped wall 14 is disposed in the starting end portion of the combustible gas generation catalyst chamber 11, an air-fuel mixing chamber 12 is formed on the inside of the ring-shaped wall 14, and air 3 and liquid fuel 2 are supplied to the air-fuel mixing chamber 12 so that an air-fuel mixture gas 23 is formed in the air-fuel mixing chamber 12, the air-fuel mixture gas 23 is supplied to the combustible gas generation catalyst 13, and the combustible gas 4 is generated using the combustible gas generation catalyst 13, and as illustrated in FIGS. 3(A) and 3(B), FIGS. 4(A) and 4(B), and FIG. 7 a core material 15 is inwardly inserted into the center portion of the ring-shaped wall 14 so that the air-fuel mixing chamber 12 is formed between the inner peripheral surface 16 of the ring-shaped wall 14 and the outer peripheral surface 18 of the core material 15, and the air-fuel mixture gas 23 of the air-fuel mixing chamber 12 is supplied from the terminal end portion of the air-fuel mixing chamber 12 to a portion near the center portion of the combustible gas generation catalyst 13, and the heat-dissipating outer peripheral surface 26 of a heater 25 is exposed to the air-fuel mixing chamber 12 by using the heater 25 as the core material 15, and when the combustible gas 4 starts being generated, heat is directly radiated from the heat-dissipating outer peripheral surface 26 of the heater 25 to the air-fuel mixing chamber 12.

The present invention according to a preferred embodiment has the following effects.

The generation of a combustible gas can be smoothly started.

As illustrated in FIGS. 3(A) and 3(B), FIGS. 4(A) and 4(B), and FIG. 7, the heat-dissipating outer peripheral surface 26 of the heater 25 is exposed to the air-fuel mixing chamber 12 by using the heater 25 as the core material 15 and, when the combustible gas 4 starts being generated, the heat is directly radiated from the heat-dissipating outer peripheral surface 26 of the heater 25 to the air-fuel mixing chamber 12. Accordingly, the generation of the combustible gas 4 can be smoothly started because the heat of the heater 25 is rapidly transferred to the air-fuel mixing chamber 12 and the air-fuel mixture gas 23 is rapidly formed.

The size of a combustible gas generator can be reduced.

The size of the combustible gas generator 1 can be reduced because an intervening substance does not exist between the heater 25 and the air-fuel mixing chamber 12, as illustrated in FIGS. 3(A) and 3(B), FIGS. 4(A) and 4(B), and FIG. 7.

The generation of a combustible gas can be efficiently performed.

As illustrated in FIGS. 3(A) and 3(B), FIGS. 4(A) and 4(B), and FIG. 7, since the air-fuel mixture gas 23 of the air-fuel mixing chamber 12 is supplied from the terminal end portion of the air-fuel mixing chamber 12 in a portion near the center portion of the combustible gas generation catalyst 13, it is difficult for heat to escape, a high temperature state is maintained, and the combustible gas 4 can be efficiently generated in the portion near the center portion of the combustible gas generation catalyst 13 where high catalyst activity is obtained.

The present invention according to a further preferred embodiment exhibits the following effects in addition to the effects of the present invention according to the preferred embodiment described above.

The generation of a combustible gas can be smoothly started.

As illustrated in FIGS. 3(A) and 3(B), FIGS. 4(A) and 4(B), and FIG. 7, when the combustible gas 4 starts being generated, heat is directly radiated from the heat-dissipating outer peripheral surface 26 of the heater 25 to the air-fuel mixture gas introduction gap 28, and thus the heat of the heater 25 is rapidly transferred to the air-fuel mixture gas introduction gap 28. Accordingly, the generation of the combustible gas 4 can be smoothly started because the dew condensation of the air-fuel mixture gas 23 in the air-fuel mixture gas introduction gap 28 is suppressed.

The size of a combustible gas generator can be reduced.

The size of the combustible gas generator 1 can be reduced because an intervening substance does not exist between the heater 25 and the air-fuel mixture gas introduction gap 28, as illustrated in FIGS. 3(A) and 3(B), FIGS. 4(A) and 4(B), and FIG. 7.

Thermal damage to the combustible gas generation catalyst or the ring-shaped wall can be prevented.

As illustrated in FIGS. 3(A) and 3(B), FIGS. 4(A) and 4(B), and FIG. 7, the air-fuel mixture gas 23 of the air-fuel mixing chamber 12 is introduced into the combustible gas generation catalyst 13 through the air-fuel mixture gas introduction gap 28. Accordingly, thermal damage to the combustible gas generation catalyst 13 or the ring-shaped wall 14 can be prevented because the occurrence of flaming combustion of the air-fuel mixture gas 23 is suppressed by the anti-inflammation function of the air-fuel mixture gas introduction gap 28.

The generation of a combustible gas can be efficiently performed.

As illustrated in FIGS. 3(A) and 3(B), FIGS. 4(A) and 4(B), FIG. 7, the air-fuel mixture gas 23 of the air-fuel mixing chamber 12 is introduced from the terminal end portion of the air-fuel mixing chamber 12 to the air-fuel mixture gas inlet face 27 near the center portion of the combustible gas generation catalyst 13 through the air-fuel mixture gas introduction gap 28, thereby making heat difficult to escape and maintaining a high temperature state. Accordingly, the combustible gas 4 can be efficiently generated at the air-fuel mixture gas inlet face 27 near the center portion of the combustible gas generation catalyst 13 where high catalyst activity is obtained.

The present invention according to a further preferred embodiment exhibits the following effects in addition to the effects of the present invention according to the preferred embodiment described above.

Thermal damage to the combustible gas generation catalyst or the ring-shaped wall can be prevented.

As illustrated in FIGS. 3(A) and 3(B), FIGS. 4(A) and 4(B), and FIG. 7, an air-fuel mixture gas supply throttle part 17 is installed in the terminal end portion of the inner peripheral surface 16 of the ring-shaped wall 14, and an air-fuel mixture gas supply throttle gap 20 is formed between the air-fuel mixture gas supply throttle part 17 and the outer peripheral surface 18 of the core material 15. Accordingly, thermal damage to the combustible gas generation catalyst 13 or the ring-shaped wall 14 can be prevented because the occurrence of flaming combustion of the air-fuel mixture gas 23 is suppressed by the anti-inflammation function of the air-fuel mixture gas supply throttle gap 20.

The combustible gas generator can be easily assembled.

As illustrated in FIGS. 3(A) and 3(B), FIGS. 4(A) and 4(B), and FIG. 7, the inner peripheral surface 16 of the ring-shaped wall 14 and the outer peripheral surface 18 of the core material 15 are mutually positioned and the air-fuel mixture gas supply throttle part 17 and the outer peripheral surface 18 of the core material 15 are also mutually positioned, through a spacer protrusion 29. Accordingly, the assembly of the combustible gas generator 1 can be easily performed because this positioning can be accurately performed without using a tool.

The present invention according to a further preferred embodiment exhibits the following effects in addition to the effects of the present invention according to the preferred embodiment described above.

Thermal damage to the combustible gas generation catalyst or the ring-shaped wall can be prevented.

As illustrated in FIGS. 3(A) and 3(B), FIGS. 4(A) and 4(B), and FIG. 7, the air-fuel mixture gas supply throttle part 17 is installed in the terminal end portion of the inner peripheral surface 16 of the ring-shaped wall 14, and the air-fuel mixture gas supply throttle gap 20 is formed between the air-fuel mixture gas supply throttle part 17 and the outer peripheral surface 18 of the core material 15. Accordingly, thermal damage to the combustible gas generation catalyst 13 or the ring-shaped wall 14 can be prevented because the occurrence of flaming combustion of an air-fuel mixture gas 23 is suppressed by the anti-inflammation function of the air-fuel mixture gas supply throttle gap 20.

The assembly of the combustible gas generator can be easily performed.

As illustrated in FIGS. 3(A) and 3(B), FIGS. 4(A) and 4(B), and FIG. 7, the inner peripheral surface 16 of the ring-shaped wall 14 and the outer peripheral surface 18 of the core material 15 are mutually positioned and the air-fuel mixture gas supply throttle part 17 and the outer peripheral surface 18 of the core material 15 are also mutually positioned, through the spacer protrusion 29. Furthermore, the air-fuel mixture gas inlet face 27 of the combustible gas generation catalyst 13 and the outer peripheral surface 18 of the core material 15 are mutually positioned through the circumferential wall 10 of the combustible gas generation catalyst chamber 11, the ring-shaped wall 14, and the spacer protrusion 29. Accordingly, the assembly of the combustible gas generator 1 can be easily performed because this positioning can be accurately performed without using a tool.

The present invention according to a further preferred embodiment exhibits the following effects in addition to the effects of the present invention according to the preferred embodiment described above.

The leakage of gas between a placement face and the subject placement face of the ring-shaped wall can be suppressed.

As illustrated in FIGS. 3(A) and 3(B), FIGS. 4(A) and 4(B), and FIG. 7, a position adjustment protrusion unit 30 placed more inward than the subject placement face 32 is installed in the terminal end portion of the ring-shaped wall 14, and the position adjustment protrusion unit 30 is inwardly inserted into the starting end portion of the circumferential wall 10 of the combustible gas generation catalyst chamber 11. Accordingly, the leakage of gas between a placement face 31 and the subject placement face 32 of the ring-shaped wall 14 can be suppressed because the leakage of the air-fuel mixture gas 23 or the combustible gas 4 from the starting end portion of the combustible gas generation catalyst chamber 11 is suppressed by the tight fit of the position adjustment protrusion unit 30.

The present invention according to a further preferred embodiment exhibits the following effects in addition to the effects of the present invention according to the preferred embodiment described above.

A reduction in the axial force of a mounting bolt can be suppressed.

As illustrated in FIGS. 4(A) and 4(B), an adiabatic space 34 is formed in the position adjustment protrusion unit 30 between the combustible gas generation catalyst 13 and a mounting bolt 33. Accordingly, the transfer of heat generated by using the combustible gas generation catalyst 13 is hindered in the adiabatic space 34, and the thermal expansion of the mounting bolt 33 is suppressed. Consequently, a reduction in the axial force of the mounting bolt 33 can be suppressed.

The present invention according to a further preferred embodiment exhibits the following effects in addition to the effects of the present invention according to the preferred embodiment described above.

A reduction in the axial force of a mounting bolt can be suppressed.

As illustrated in FIG. 4(B), the adiabatic space 34 is concavely formed in the outer peripheral surface of the position adjustment protrusion unit 30, a sealant 35 is placed in the adiabatic space 34, and the sealant 35 is sealed between the position adjustment protrusion unit 30 and the circumferential wall 10 of the combustible gas generation catalyst chamber 11. This makes a gasket unnecessary between the placement face 31 of the combustible gas generation catalyst chamber 11 and the subject placement face 32 of the ring-shaped wall 14. Accordingly, a reduction in the axial force of the mounting bolt 33 resulting from a reduction in the elastic force of the gasket can be suppressed.

The present invention according to a further preferred embodiment exhibits the following effects in addition to the effects of the present invention according to the preferred embodiment described above.

The ring-shaped wall can be easily processed.

As illustrated in FIGS. 5(A) and 5(B), FIGS. 6(A) to 6(C), FIGS. 8(A) to 8(D), a plurality of liquid fuel inlets 42 and liquid fuel outlets 36 are formed at specific intervals in the gasket 40 in a peripheral direction thereof, the liquid fuel outlets 36 are drawn from the respective liquid fuel inlets 42 toward the inside of the gasket 40, a liquid fuel guidance groove 41 is concavely formed in any one of the cover placement face 38 of the ring-shaped wall 14 and the subject placement face 39 of the cover 37 in a peripheral direction thereof, the respective liquid fuel inlets 42 are made to communicate with the opening of the liquid fuel guidance groove 41, and the liquid fuel 2 supplied to the liquid fuel guidance groove 41 is flowed out from the liquid fuel outlets 36 to the air-fuel mixing chamber 12 through the respective liquid fuel inlets 42. Accordingly, the ring-shaped wall 14 can be easily processed as compared with the case in which a liquid fuel guidance passage or a liquid fuel outlet is formed in the ring-shaped wall 14.

The present invention according to a further preferred embodiment exhibits the following effects in addition to the effects of the present invention according to the preferred embodiment described above.

The ring-shaped wall can be easily processed.

As illustrated in FIGS. 5(A) and 5(B) and FIGS. 6(A) to 6(C), the plurality of air inlets 42b and the air outlets 36b are installed at specific intervals in the gasket 40 in a peripheral direction thereof, the air outlets 36b are drawn from the respective air inlets 42b toward the inside of the gasket 40, an air guidance groove 41b is concavely formed in any one of the cover placement face 38 of the ring-shaped wall 14 and the subject placement face 39 of the cover 37 in a peripheral direction thereof, the respective air inlets 42b are made to communicate with the opening of the air guidance groove 41b, and the air 3 supplied to the air guidance groove 41b is flowed out from the air outlets 36b to the air-fuel mixing chamber 12 through the respective air inlets 42b. Accordingly, the ring-shaped wall 14 can be easily processed as compared with the case in which an air guidance passage or an air outlet is formed in the ring-shaped wall 14.

The present invention according to a further preferred embodiment exhibits the following effects in addition to the effects of the present invention according to the preferred embodiment described above.

The generation of a combustible gas can be accelerated.

As illustrated in FIGS. 3(A) and 3(B), FIGS. 4(A) and 4(B), and FIG. 7, the plurality of liquid fuel outlets 36 is formed at specific intervals along the upper circumferential portion of the inner peripheral surface 16 of the ring-shaped wall 14 in a peripheral direction thereof, and the liquid fuel 2 flowed out from the respective liquid fuel outlets 36 is made to flow by self-weight along the inner peripheral surface 16 of the ring-shaped wall 14. Accordingly, a plurality of flows of the liquid fuel 2 flowing along the inner peripheral surface 16 of the ring-shaped wall 14 comes in contact with air 3, thus becoming the air-fuel mixture gas 23. Accordingly, a concentration distribution of the air-fuel mixture gas 23 becomes uniform and thus the generation of the combustible gas 4 can be accelerated.

An air-fuel mixture gas can be formed without a hindrance even when a combustible gas generator is inclined.

As illustrated in FIGS. 3(A) and 3(B), FIGS. 4(A) and 4(B), and FIG. 7, the inner peripheral surface 16 of the ring-shaped wall 14 has a taper form in which the diameter of the inner peripheral surface 16 is reduced toward a lower terminal end portion. Accordingly, the air-fuel mixture gas 23 can be formed without a hindrance because the liquid fuel 2 flows along the inner peripheral surface 16 of the ring-shaped wall 14 by self-weight even when the combustible gas generator 1 is inclined.

The present invention according to a further preferred embodiment exhibits the following effects in addition to the effects of the present invention according to the preferred embodiment described above.

A combustible gas can be burnt by oxygen within an exhaust gas even when a temperature of the exhaust gas is low.

As illustrated in FIG. 2, when the secondary air mixing gas 49 passes through the combustible catalyst 46, part of the combustible gas 4 is subject to catalyst combustion by means of the secondary air 48, the temperature of the remainder of the combustible gas 4 passing through the combustion catalyst 46 is raised by heat of the combustion, and the combustible gas 4 having a raised temperature is discharged from the combustible gas discharge port 6 to the exhaust passage 7. Accordingly, the combustible gas 4 can be burnt by oxygen within the exhaust gas 8 because the combustible gas 4 is ignited even when a temperature of the exhaust gas 8 is low.

The present invention according to a further preferred embodiment exhibits the following effects in addition to the effects of the present invention according to the preferred embodiment described above.

A secondary air mixing chamber can be formed simply and easily.

As illustrated in FIG. 9(A), compartment plate placement faces 50 and 51 are formed in the terminal end portion of the combustible gas generation catalyst chamber 11, a compartment plate 52 is placed in and fixed to the compartment plate placement faces 50 and 51, and the secondary air mixing chamber 44 is comparted (i.e., separated) and formed on the lower side of the combustible gas generation catalyst chamber 11 by the compartment plate 52. Accordingly, the secondary air mixing chamber 44 can be simply formed.

A combustible gas can be efficiently generated.

As illustrated in FIG. 9(A), a plurality of combustible gas outlet holes 54 maintained at specific intervals in the circumferential portion 53 of the compartment plate 52 in a peripheral direction thereof is opened, and the combustible gas 4 generated by using the combustible gas generation catalyst 13 is supplied to the secondary air mixing chamber 44 through the combustible gas outlet holes 54. Accordingly, the air-fuel mixture gas 23 introduced into the center portion of the combustible gas generation catalyst 13 through the air-fuel mixture gas supply throttle gap 20 passes evenly through the combustible gas generation catalyst 13 toward a plurality of combustible gas outlet holes 54 in the circumferential portion 53 of the compartment plate 52 in the terminal end portion of the combustible gas generation catalyst chamber 11, thereby being capable of efficiently generating the combustible gas 4.

The present invention according to a further preferred embodiment exhibits the following effects in addition to the effects of the present invention according to the preferred embodiment described above.

The secondary air mixing chamber can be formed simply and easily.

As illustrated in FIG. 9(B), the compartment plate placement faces 50 and 51 are formed in the terminal end portion of the combustible gas generation catalyst chamber 11, the compartment plate 52 is placed in and fixed to the compartment plate placement faces 50 and 51, and the secondary air mixing chamber 44 is comparted (i.e., separated) and formed on the lower side of the combustible gas generation catalyst chamber 11 by the compartment plate 52. Accordingly, the secondary air mixing chamber 44 can be simply formed.

A combustible gas can be efficiently generated.

As illustrated in FIG. 9(B), a combustible gas outlet gap 56 is formed along the circumferential portion 53 of the compartment plate 52 between the circumferential portion 53 of the compartment plate 52 and the ventricular wall 55 of the secondary air mixing chamber 44, and the combustible gas 4 generated by using the combustible gas generation catalyst 13 is supplied to the secondary air mixing chamber 44 through the combustible gas outlet gap 56. Accordingly, the air-fuel mixture gas 23 introduced into the center portion of the combustible gas generation catalyst 13 through the air-fuel mixture gas supply throttle gap 20 passes evenly through the combustible gas generation catalyst 13 toward the combustible gas outlet gap 56 along the circumferential portion 53 of the compartment plate 52 in the terminal end portion of the combustible gas generation catalyst chamber 11, thereby being capable of efficiently generating the combustible gas 4.

The present invention according to a further preferred embodiment exhibits the following effects in addition to the effects of the present invention according to the preferred embodiment described above.

A secondary air confluence chamber and a secondary air mixing gas expansion chamber can be formed simply and easily.

As illustrated in FIGS. 9(A) and 9(B), a ring-shaped compartment wall 57 is installed at the center portion of the secondary air mixing chamber 44, a secondary air confluence chamber 58 on the circumference of the ring-shaped compartment wall 57 and secondary air mixing gas expansion chambers 59 and 59 on the inside of the ring-shaped compartment wall 57 are comparted (i.e., separated) by the ring-shaped compartment wall 57, the openings of the secondary air mixing gas expansion chambers 59 and 59 are closed by a compartment plate 52, a throttle hole 60 is opened at the inlet of the secondary air mixing gas expansion chamber 59, and a secondary air mixing gas outlet 61 is opened at the outlet of the secondary air mixing gas expansion chamber 59. Accordingly, the secondary air confluence chamber 58 and the secondary air mixing gas expansion chamber 59 can be formed simply and easily.

The combustion of the catalyst in a combustible catalyst can be efficiently performed.

As illustrated in FIGS. 9(A) and 9(B), the combustible gas 4 and the secondary air 48 are supplied from the combustible gas generation catalyst chamber 11 and the secondary air supply source 47 to the secondary air confluence chamber 58. Accordingly, the secondary air mixing gas 49 formed by joining the combustible gas 4 and the secondary air 48 in the secondary air confluence chamber 58 is formed, the secondary air mixing gas 49 is throttled by the throttle holes 60 and then diffused while being expanded in the secondary air mixing gas expansion chamber 59, and the secondary air mixing gas 49 is supplied to the combustion catalyst 46 via the secondary air mixing gas outlet 61. Consequently, catalyst combustion in the combustion catalyst 46 can be efficiently performed because a concentration distribution of the secondary air mixing gas 49 supplied to the combustion catalyst 46 becomes uniform.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is a diagram illustrating the assembly structure of the combustible gas generator shown in FIG. 2, wherein

FIG. 4 is a diagram illustrating another modification example of the assembly structure of the combustible gas generator, wherein

FIG. 5 is a diagram illustrating a supply structure for liquid fuel to the air-fuel mixing chamber of the combustible gas generator shown in FIG. 2, wherein FIG. 5(A) is a cross-sectional view taken along a line VA-VA in FIG. 2 and FIG. 5(B) is a cross-sectional view taken along a line B-B in FIG. 5(A);

FIG. 6 is an explanatory diagram of a part used in the supply structure for liquid fuel to the air-fuel mixing chamber shown in FIG. 5, wherein FIG. 6(A) is a plan view of a ring-shaped wall having a core inserted therein, FIG. 6(B) is a plan view of a lower gasket, and FIG. 6(C) is a plan view of an upper gasket;

FIG. 7 is a diagram illustrating a first modification example of the supply structure for liquid fuel to the air-fuel mixing chamber shown in FIG. 5, corresponding to FIG. 3(A);

FIG. 8 is a diagram illustrating a modification example of the supply structure for liquid fuel to the air-fuel mixing chamber shown in FIG. 5, wherein FIG. 8(A) is a diagram of a first modification example, corresponding to FIG. 5(A), FIG. 8(B) is a cross-sectional view taken along a line B-B in FIG. 8(A), FIG. 8(C) is a diagram of a second modification example, corresponding to FIG. 8(B), and FIG. 8(D) is a longitudinal sectional view of the second modification example of FIG. 8(C) in another part;

FIG. 9 is a diagram illustrating the compartment structure of the secondary air mixing chamber of the combustible gas generator shown in FIG. 2, wherein

FIG. 10 is a diagram illustrating the fixing structure of the combustible catalyst of the exhaust pipe shown in FIG. 2, wherein FIG. 10(A) is an enlarged view of major parts in FIG. 2, FIG. 10(B) is a cross-sectional view taken along a line B-B in FIG. 10(A), FIG. 10(C) is a diagram of a first modification example, corresponding to FIG. 10(A), FIG. 10(D) is a diagram of a second modification example, corresponding to FIG. 10(A), FIG. 10(E) is a diagram of a third modification example, corresponding to FIG. 10(A), and FIG. 10(F) is a diagram of a fourth modification example, corresponding to FIG. 10(A);

DETAILED DESCRIPTION OF THE INVENTION

FIGS. 1 to 13 are diagrams illustrating an exhaust gas treatment device for a diesel engine according to an embodiment of the present invention. In the present embodiment, a vertical (upright type) multi-cylinder exhaust gas treatment device for a diesel engine is described.

An outline of the exhaust gas treatment device is as follows.

Figure 11:
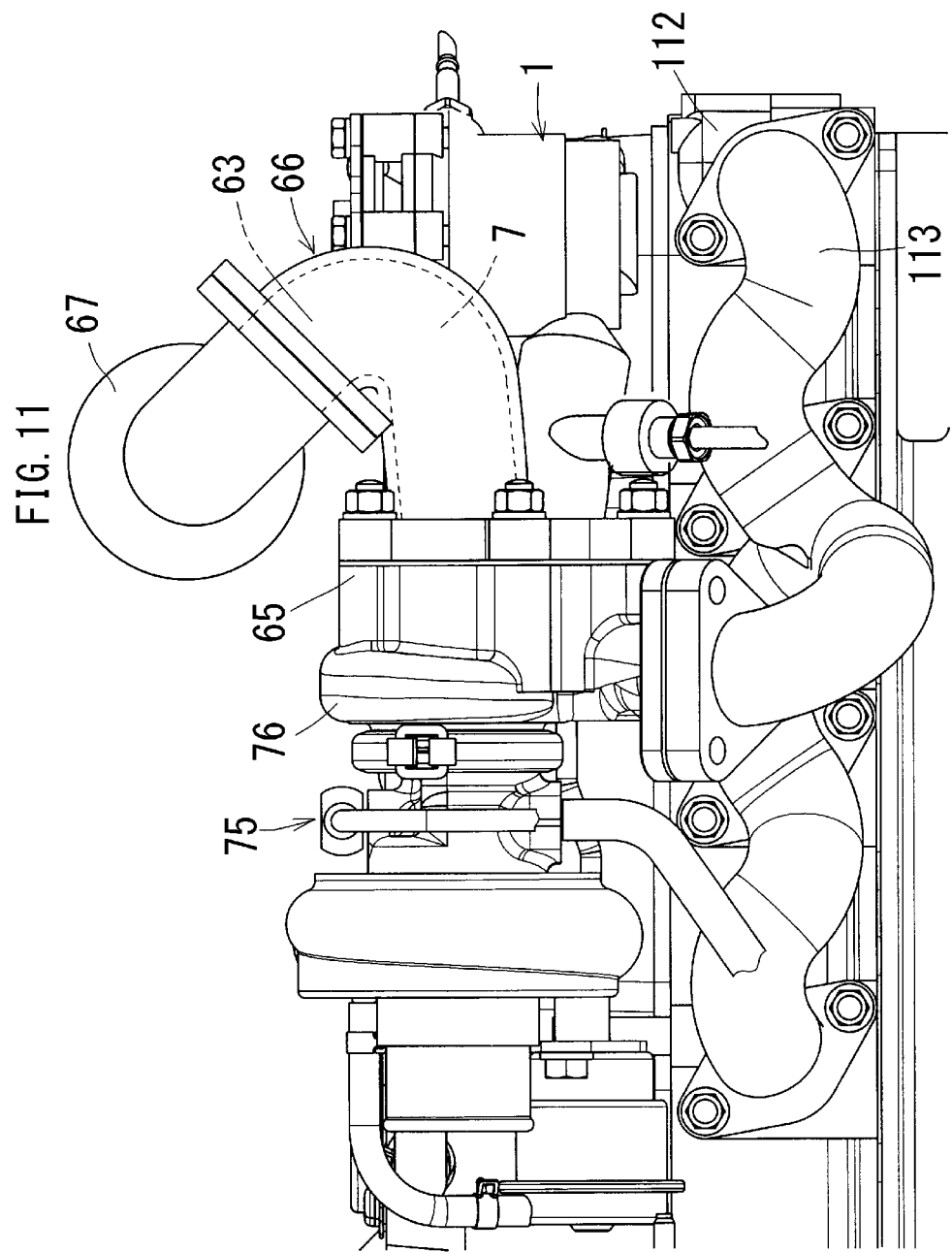
FIG. 11 is a side view of major parts of a diesel engine including the exhaust gas treatment device shown in FIG. 1.
Figure 12:
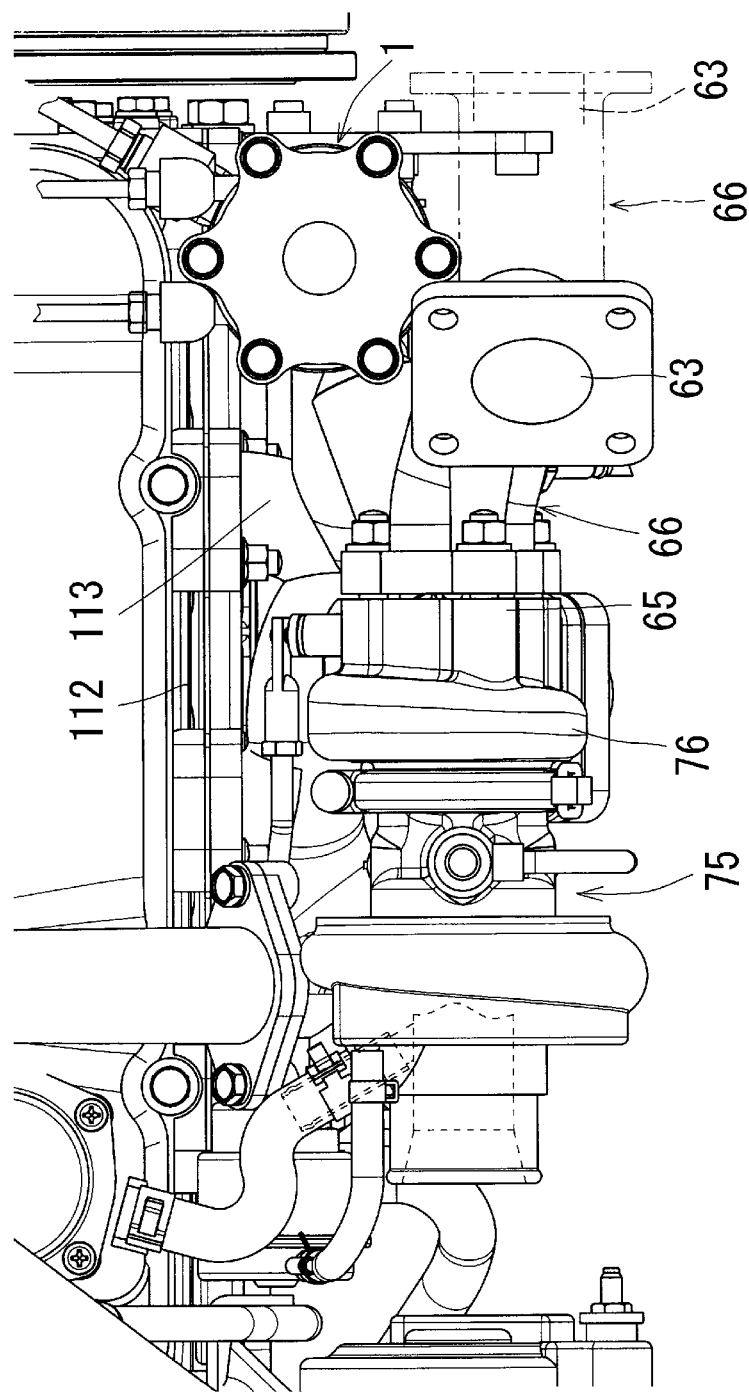
FIG. 12 is a plan view of major parts of the diesel engine including the exhaust gas treatment device shown in FIG. 1.
Figure 13:
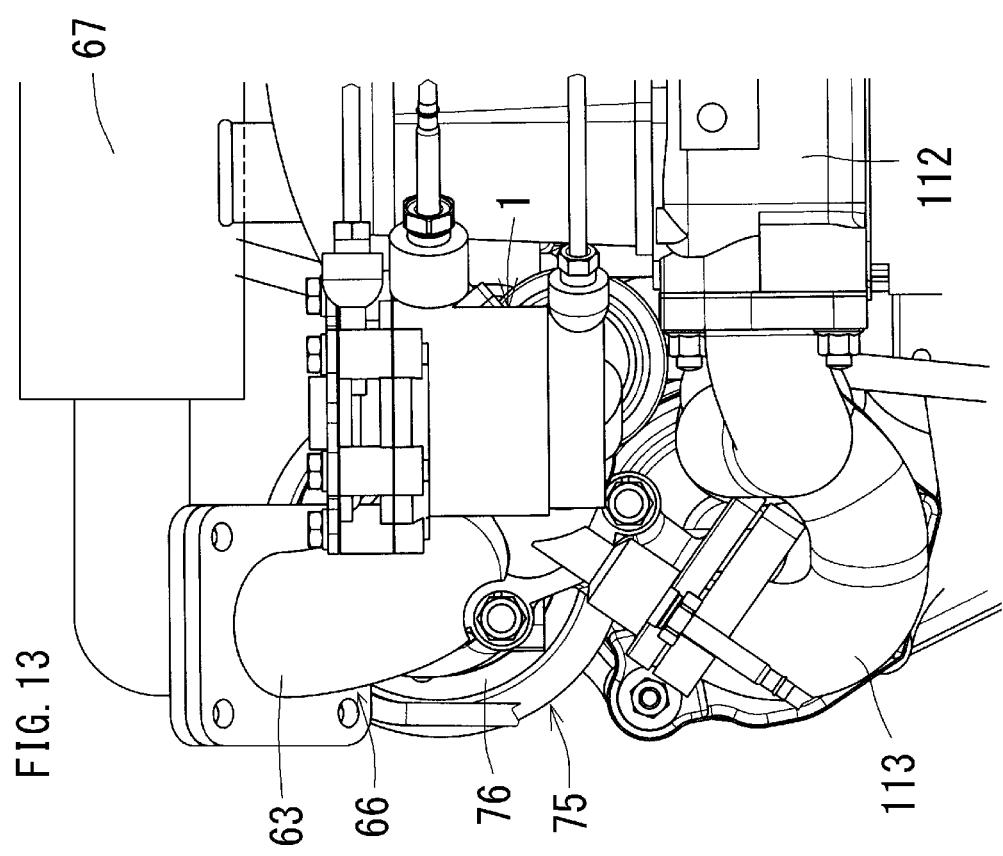
FIG. 13 is a front view of major parts of the diesel engine including the exhaust gas treatment device shown in FIG. 1.

As shown in FIGS. 11 to 13, an exhaust manifold 113 is mounted on the lateral side of the cylinder head 112, a super charger 75 is mounted over the exhaust manifold 113, and a DPF casing 67 is coupled to the exhaust turbine 76 of the super charger 75 through an exhaust pipe 66. A combustible gas generator 1 is installed in the exhaust pipe 66.

Figure 1:
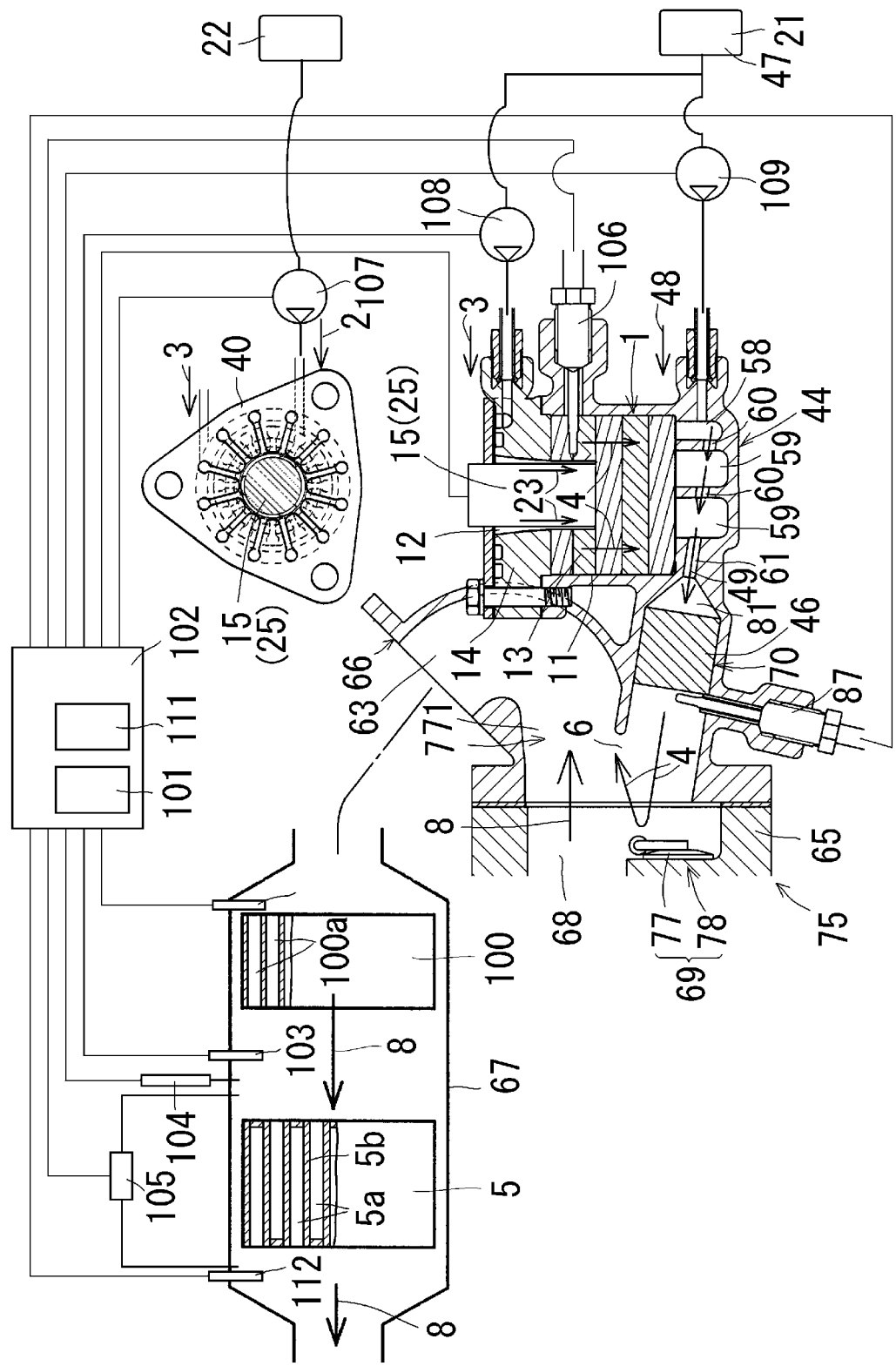
FIG. 1 is a diagram of an exhaust gas treatment device for a diesel engine according to a preferred embodiment of the present invention.

As shown in FIG. 1, a combustible gas 4 is generated by the combustible gas generator 1, the combustible gas 4 is discharged from a combustible gas discharge port 6 to an exhaust passage 7 in the upper stream of a DPF 5, the combustible gas 4 is burnt by oxygen within the exhaust gas 8, a temperature of the exhaust gas 8 is raised by heat of the combustion, and a PM accumulated in the DPF 5 is burnt and removed by the heat of the exhaust gas 8.

As shown in FIG. 1, a DOC 100 is accommodated on the upper stream of the DPF casing 67 and the DPF 5 is accommodated on the lower stream of the DPF casing 67. The DOC is an abbreviation of a diesel oxidation catalyst.

The DPF 5 is a honeycomb carrier of ceramics and is a wall flow monolith in which the end parts of adjacent cells 5a are alternately blocked. The PM of an exhaust gas, passing through the inside of the cells 5a and the walls 5b of the cells 5a, is captured by the walls 5b of the cells 5a.

The DOC 100 is a honeycomb carrier of ceramics. The DOC 100 has a flow-through structure in which an oxidation catalyst is supported and both ends of the cells 100a are opened. The exhaust gas 8 passes through the inside of the cells 100a. When the combustible gas 4, together with the exhaust gas 8, passes through the DOC 100, the combustible gas 4 is subject to catalyst combustion by oxygen within the exhaust gas 8 by means of the DOC 100, a temperature of the exhaust gas 8 is raised, and the PM accumulated in the DPF 5 is burnt and removed by the heat of the exhaust gas 8.

The construction of the combustible gas generator is as follows.

Figure 2:
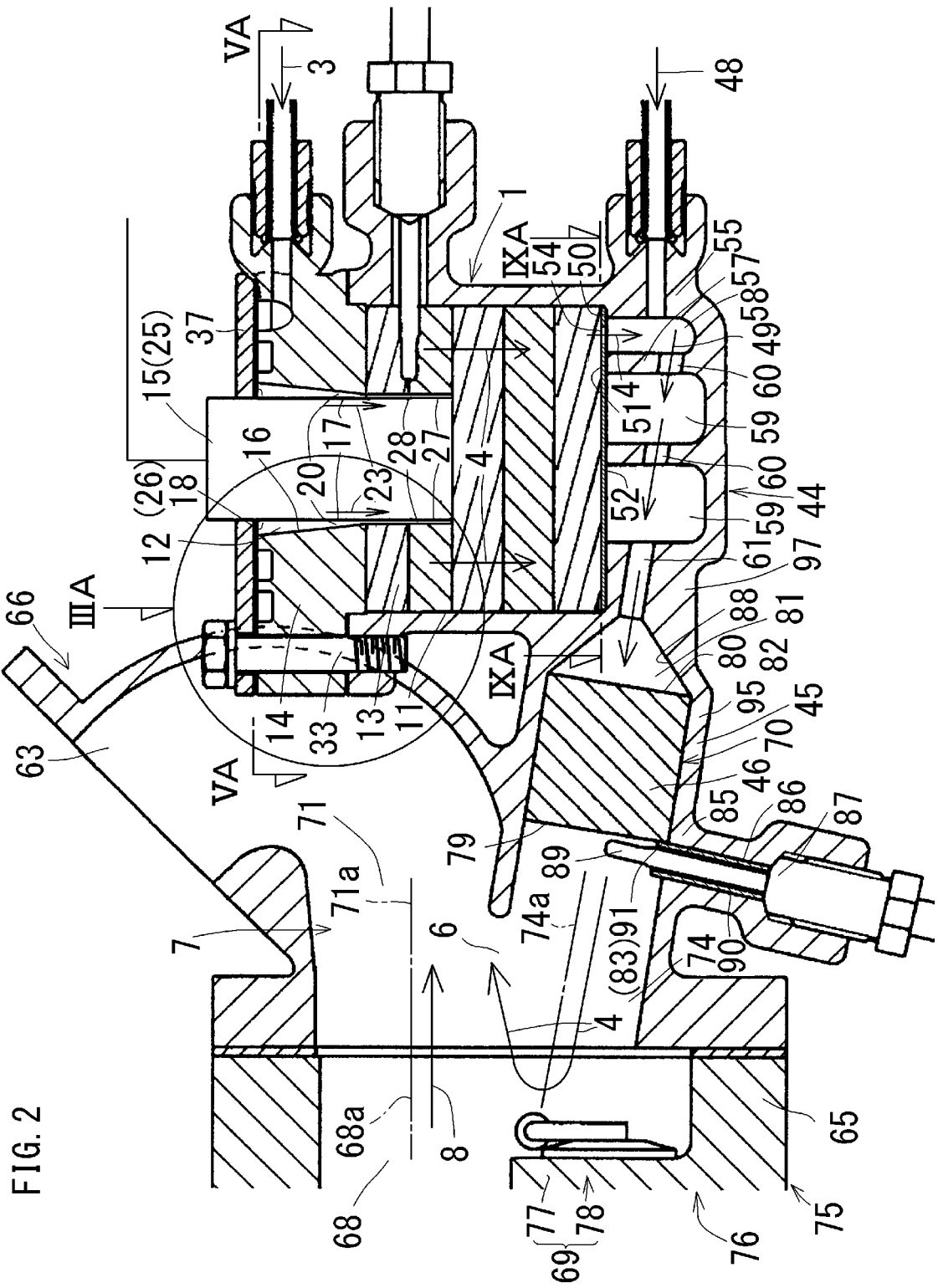
FIG. 2 is a longitudinal sectional view of an exhaust pipe including the combustible gas generator of the device shown in FIG. 1.

As shown in FIGS. 1 and 2, a combustible gas generation catalyst chamber 11 is installed in the combustible gas generator 1, a combustible gas generation catalyst 13 is accommodated in the combustible gas generation catalyst chamber 11, a ring-shaped wall 14 is disposed in the starting end portion (top end portion) of the combustible gas generation catalyst chamber 11, an air-fuel mixing chamber 12 is formed on the inside of the ring-shaped wall 14, and air 3 and liquid fuel 2 are supplied to the air-fuel mixing chamber 12. Accordingly, an air-fuel mixture gas 23 is formed in the air-fuel mixing chamber 12, the air-fuel mixture gas 23 is supplied to the combustible gas generation catalyst 13, and the combustible gas 4 is generated by using the combustible gas generation catalyst 13.

The liquid fuel 2 is diesel oil (i.e., diesel fuel) and supplied from a liquid fuel supply source 22. The air 3 is supplied from an air supply source 21. The liquid fuel supply source 22 is a fuel tank, and the air supply source 21 is an air cleaner.

The combustible gas generation catalyst 13 supports a partial oxidation catalyst component in a carrier of ceramics. The combustible gas 4 including hydrogen or carbon monoxide is generated by partially oxidizing the liquid fuel 2.

A carrier made of a metal line having a cubic crosshatch structure or a carrier supporting an oxidation catalyst component may be used as the combustible gas generation catalyst 13. If the oxidation catalyst component is used, the liquid fuel 2 is evaporated by heat generated by oxidizing part of the liquid fuel 2, whereby the combustible gas 4 is generated.

As shown in FIG. 2, a core material 15 is inwardly inserted into the center portion of the ring-shaped wall 14 so that the air-fuel mixing chamber 12 is formed between the inner peripheral surface 16 of the ring-shaped wall 14 and the outer peripheral surface 18 of the core material 15, and the air-fuel mixture gas 23 of the air-fuel mixing chamber 12 is supplied from the terminal end portion (bottom end portion) of the air-fuel mixing chamber 12 to a portion near the center portion of the combustible gas generation catalyst 13.

Accordingly, the combustible gas 4 can be efficiently generated in the portion near the center portion of the combustible gas generation catalyst 13 where high catalyst activity is obtained because it is difficult for heat to escape and a high temperature state is maintained.

As shown in FIG. 2, the heat-dissipating outer peripheral surface 26 of a heater 25 is exposed to the air-fuel mixing chamber 12 by using the heater 25 as the core material 15, and when the combustible gas 4 starts being generated, heat is directly radiated from the heat-dissipating outer peripheral surface 26 of the heater 25 to the air-fuel mixing chamber 12.

Accordingly, the generation of the combustible gas 4 can be smoothly started because the heat of the heater 25 is rapidly transferred to the air-fuel mixing chamber 12 and the air-fuel mixture gas 23 is rapidly formed. Furthermore, the size of the combustible gas generator 1 can be reduced because an intervening substance does not exist between the heater 25 and the air-fuel mixing chamber 12.

The heater 25 is an electric heater for performing heating when the combustible gas 4 starts being generated. A sheathed heater in which an electric heat wire is accommodated in a metal pipe is used as the heater 25.

As shown in FIG. 2, an air-fuel mixture gas inlet face 27 is installed in the inner circumference of the combustible gas generation catalyst 13 of an annular form, the core material 15 is inwardly inserted into the center portion of the combustible gas generation catalyst 13 so that an air-fuel mixture gas introduction gap 28 is formed between the air-fuel mixture gas inlet face 27 and the outer peripheral surface 18 of the core material 15, and the air-fuel mixture gas 23 of the air-fuel mixing chamber 12 is introduced from the terminal end portion (bottom end portion) of the air-fuel mixing chamber 12 to the air-fuel mixture gas inlet face 27 near the center portion of the combustible gas generation catalyst 13 through the air-fuel mixture gas introduction gap 28.

Accordingly, the combustible gas 4 can be efficiently generated at the air-fuel mixture gas inlet face 27 in a portion near the center portion of the combustible gas generation catalyst 13 where high catalyst activity is obtained because it is difficult for heat to escape and a high temperature state is maintained.

Furthermore, thermal damage to the combustible gas generation catalyst 13 or the ring-shaped wall 14 can be prevented because the occurrence of flaming combustion of the air-fuel mixture gas 23 is suppressed by the anti-inflammation function of the air-fuel mixture gas introduction gap 28.

As shown in FIG. 2, the heat-dissipating outer peripheral surface 26 of the heater 25 used in the core material 15 is exposed to the air-fuel mixture gas introduction gap 28 so that, when the combustible gas 4 starts being generated, the heat is directly radiated from the heat-dissipating outer peripheral surface 26 of the heater 25 to the air-fuel mixture gas introduction gap 28.

Accordingly, the generation of the combustible gas 4 can be smoothly started because the heat of the heater 25 is rapidly transferred to the air-fuel mixture gas introduction gap 28 and the dew condensation of the air-fuel mixture gas 23 in the air-fuel mixture gas introduction gap 28 is suppressed.

Furthermore, the size of the combustible gas generator 1 can be reduced without an intervening substance between the heater 25 and the air-fuel mixture gas introduction gap 28.

Figure 3A:
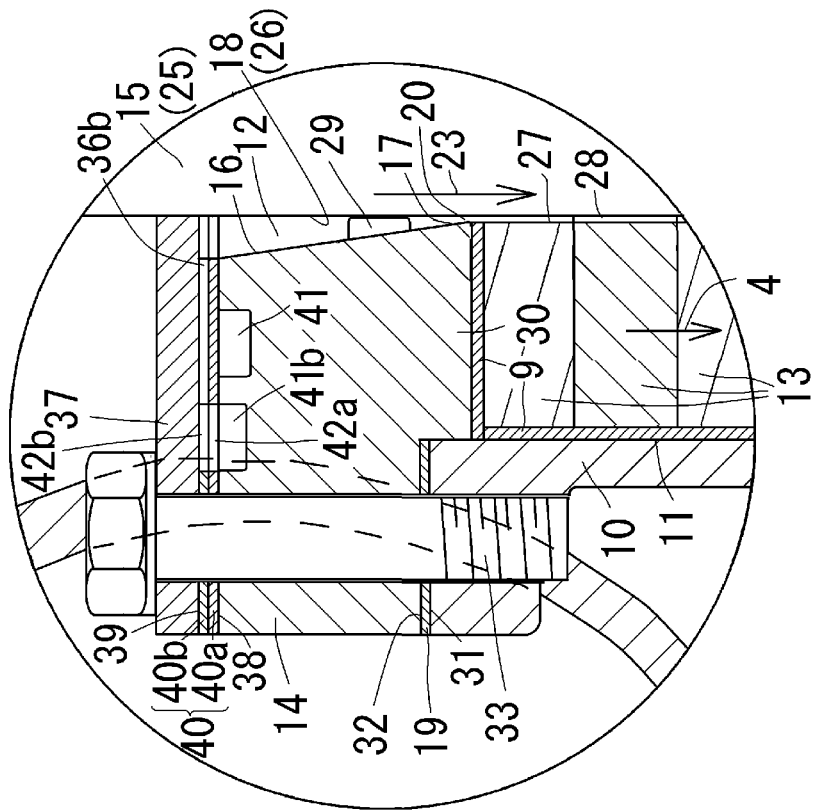
FIG. 3(A) is a partial enlarged view seen from an arrow IIIA of FIG. 2

As shown in FIG. 3(A), an air-fuel mixture gas supply throttle part 17 is installed in the terminal end portion (bottom end portion) of the inner peripheral surface 16 of the ring-shaped wall 14 and the air-fuel mixture gas supply throttle gap 20 is formed between the air-fuel mixture gas supply throttle part 17 and the outer peripheral surface 18 of the core material 15.

Accordingly, thermal damage to the combustible gas generation catalyst 13 or the ring-shaped wall 14 can be prevented because the occurrence of flaming combustion of the air-fuel mixture gas 23 is suppressed by the anti-inflammation function of the air-fuel mixture gas supply throttle gap 20.

As shown in FIG. 3(A), a spacer protrusion 29 is formed in the inner peripheral surface 16 of the ring-shaped wall 14 and the spacer protrusion 29 is brought into contact with the outer peripheral surface 18 of the core material 15. Accordingly, the inner peripheral surface 16 of the ring-shaped wall 14 and the outer peripheral surface 18 of the core material 15 are mutually positioned and the air-fuel mixture gas supply throttle part 17 and the outer peripheral surface 18 of the core material 15 are also mutually positioned, through the spacer protrusion 29.

Accordingly, the assembly of the combustible gas generator 1 can be easily performed because this positioning can be accurately performed without a tool.

The ring-shaped wall 14 and the spacer protrusion 29 are molded into one metal product.

The spacer protrusion 29 may be formed in the outer peripheral surface 18 of the core material 15, and the spacer protrusion 29 may be brought into contact with the inner peripheral surface 16 of the ring-shaped wall 14.

As shown in FIG. 3(A), the combustible gas generation catalyst 13 of an annular form is inwardly inserted into the combustible gas generation catalyst chamber 11 so that a position adjustment protrusion unit 30 is installed in the terminal end portion of the ring-shaped wall 14, and the position adjustment protrusion unit 30 is inwardly inserted into the starting end portion (top end portion) of the circumferential wall 10 of the combustible gas generation catalyst chamber 11 so that the air-fuel mixture gas inlet face 27 of the combustible gas generation catalyst 13 and the outer peripheral surface 18 of the core material 15 are mutually positioned through the circumferential wall 10 of the combustible gas generation catalyst chamber 11, the ring-shaped wall 14, and the spacer protrusion 29.

Accordingly, the assembly of the combustible gas generator 1 can be easily performed because this positioning can be accurately performed without a tool.

As shown in FIG. 3(A), in installing a ring-shaped placement face 31 in the starting end portion (top end portion) of the circumferential wall 10 of the combustible gas generation catalyst chamber 11, installing a subject placement face 32 in the terminal end portion (bottom end portion) of the ring-shaped wall 14, and placing and fixing the subject placement face 32 of the ring-shaped wall 14 in and to the placement face 31, the position adjustment protrusion unit 30 placed more inwardly than the subject placement face 32 is installed in the terminal end portion (bottom end portion) of the ring-shaped wall 14, and the position adjustment protrusion unit 30 is inwardly inserted into the starting end portion (top end portion) of the circumferential wall 10 of the combustible gas generation catalyst chamber 11.

Accordingly, the leakage of gas between the placement face 31 and the subject placement face of the ring-shaped wall 14 can be suppressed because the leakage of the air-fuel mixture gas 23 or the combustible gas 4 from the starting end portion (top end portion) of the combustible gas generation catalyst chamber 11 is suppressed by the tight fitting of the position adjustment protrusion unit 30.

As shown in FIG. 3(A), the subject placement face 32 of the ring-shaped wall 14 is placed in the placement face 31 of the combustible gas generation catalyst chamber 11 with a gasket 19 interposed therebetween, and a cover 37 is placed in the placement face 38 of the ring-shaped wall 14 with a gasket 40 interposed therebetween. They are fastened by a mounting bolt 33.

Figure 3B:
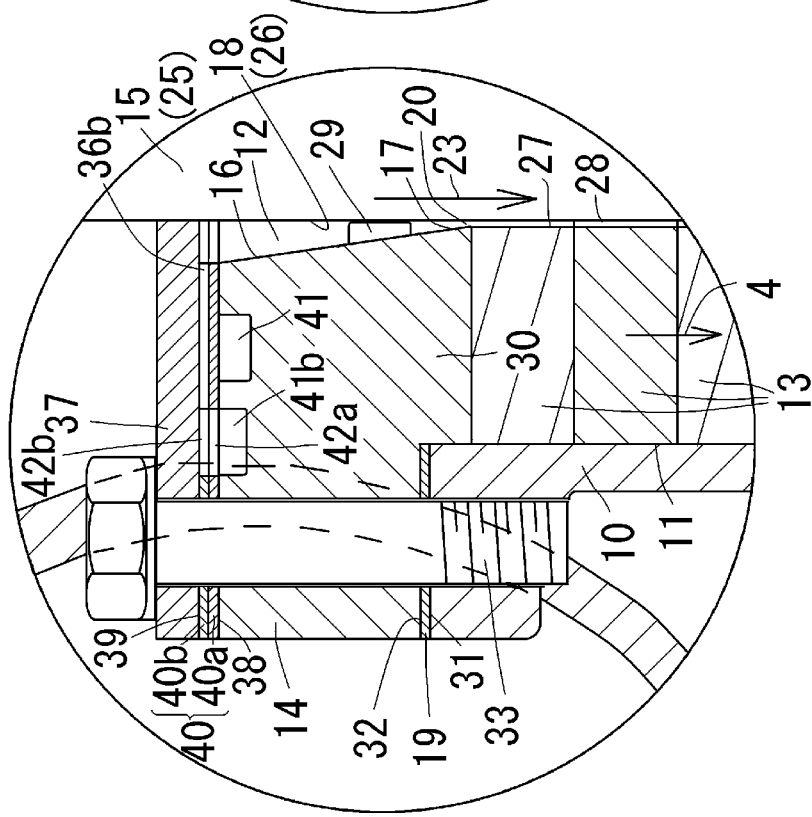
FIG. 3(B) is a diagram of a first modification example, corresponding to FIG. 3(A)

FIG. 3(B) is a first modification example of the assembly structure of the combustible gas generator. An adiabatic cushion material 9 is interposed between the surrounding face of the combustible gas generation catalyst 13 and the circumferential wall 10 of the combustible gas generation catalyst chamber 11, between the starting end face of the catalyst 13 and the position adjustment protrusion unit 30, and between the terminal end face of the catalyst 13 and a compartment plate 52 to be described later in order to fix and make adiabatic the combustible gas generation catalyst 13 in the combustible gas generation catalyst chamber 11.

A mat of glass wool is used as the adiabatic cushion material 9.

Figure 4A:
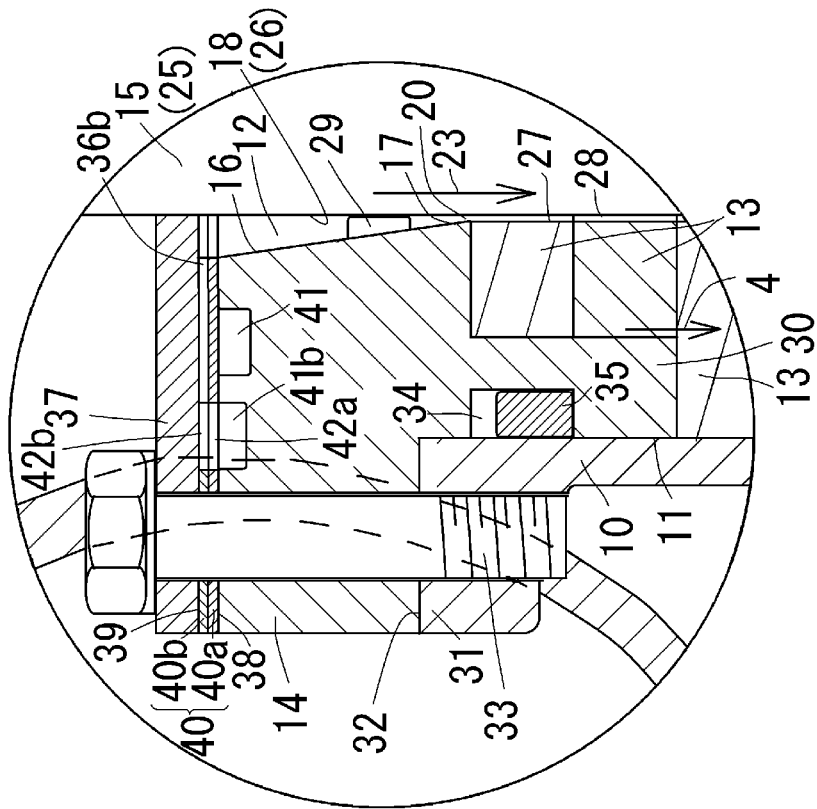
FIG. 4(A) is a diagram of a second modification example, corresponding to FIG. 3(A)

FIG. 4(A) is a second modification example. In placing and fixing the subject placement face 32 of the ring-shaped wall 14 in and to the placement face 31 of the combustible gas generation catalyst chamber 11 by means of the fastening force of the mounting bolt 33 and accommodating the combustible gas generation catalyst 13 on the inside of the position adjustment protrusion unit 30, an adiabatic space 34 is formed in the position adjustment protrusion unit 30 between the combustible gas generation catalyst 13 and the mounting bolt 33.

Accordingly, the transfer of heat generated by using the combustible gas generation catalyst 13 is suppressed by the adiabatic space 34 and thus the thermal expansion of the mounting bolt 33 can be suppressed. Accordingly, a reduction in the axial force of the mounting bolt 33, arising therefrom, can be suppressed.

Figure 4B:
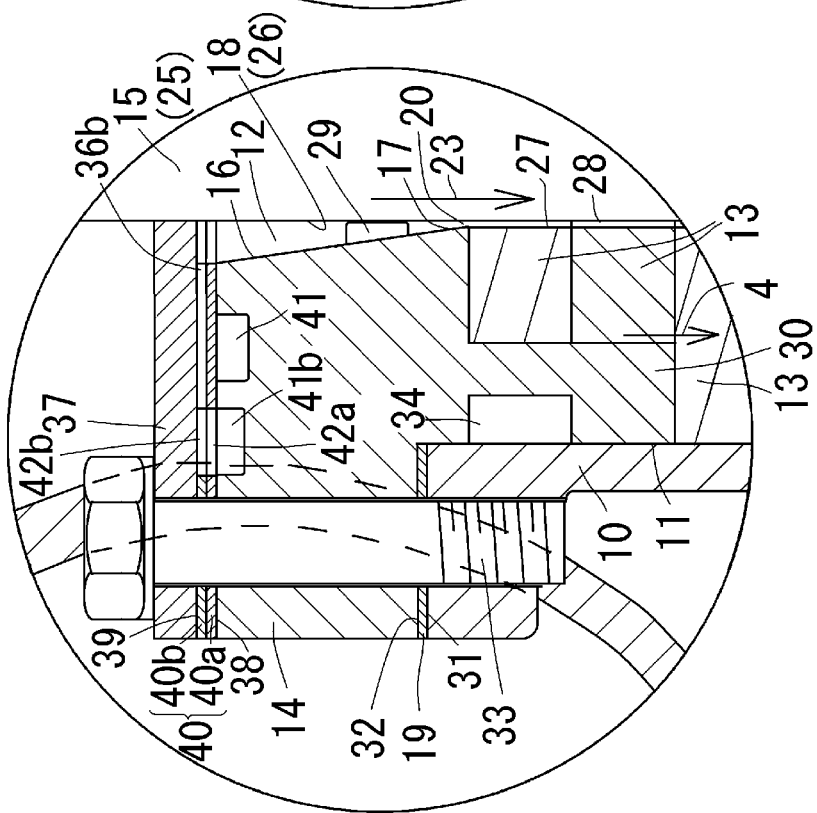
FIG. 4(B) is a diagram of a third modification example, corresponding to FIG. 3(A)

FIG. 4(B) is a third modification example and a second modification example of FIG. 4(A). In concavely forming the adiabatic space 34 in the outer peripheral surface of the position adjustment protrusion unit 30, placing a sealant 35 in the adiabatic space 34, and the sealant 35 is sealed between the circumferential wall 10 of the combustible gas generation catalyst chamber 11 and the position adjustment protrusion unit 30, the gasket 19 between the placement face 31 of the combustible gas generation catalyst chamber 11 and the subject placement face 32 of the ring-shaped wall 14 is made unnecessary.

Accordingly, a reduction in the axial force of the mounting bolt 33 resulting from a reduction in the elastic force of the gasket 19 can be suppressed.

Other structures of the first to third modification examples shown in FIG. 3(B) and FIGS. 4(A) and 4(B) are the same as those of the embodiment shown in FIG. 3(A). In the drawings, the same elements are assigned the same reference numerals.

The structure for supplying the liquid fuel and the air to the air-fuel mixing chamber is as follows.

As shown in FIGS. 5(A) and 5(B), the cover 37 is placed in the starting end portion (top end portion) of the ring-shaped wall 14, the ring-shaped cover placement face 38 is installed in the starting end portion (top end portion) of the ring-shaped wall 14, the subject placement face 39 is placed in the terminal end portion (bottom end portion) of the cover 37, and the subject placement face 39 of the cover 37 is placed in and fixed to the cover placement face 38 of the ring-shaped wall 14 with the ring-shaped gasket 40 interposed therebetween.

The gasket 40 includes a set of two sheets including a lower gasket 40a and an upper gasket 40b which are folded together.

A plurality of liquid fuel inlets 42 and liquid fuel outlets 36 are formed at specific intervals in the lower gasket 40a in a peripheral direction thereof, the liquid fuel outlets 36 are drawn from the respective liquid fuel inlets 42 toward the inside of the gasket 40, a liquid fuel guidance groove 41 is concavely formed in the cover placement face 38 of the ring-shaped wall 14 in a peripheral direction thereof, the liquid fuel inlets 42 are made to communicate with the opening of the liquid fuel guidance groove 41, and the liquid fuel 2 supplied to the liquid fuel guidance groove 41 is flowed out from the liquid fuel outlets 36 to the air-fuel mixing chamber 12 through the liquid fuel inlets 42.

Accordingly, the ring-shaped wall 14 can be easily processed as compared with the case in which a liquid fuel guidance passage or a liquid fuel outlet is formed within the ring-shaped wall 14.

As shown in FIG. 6(B), the liquid fuel inlets 42, the liquid fuel outlets 36, and air inlets 42a to be described later are formed in the lower gasket 40a made of metal in a punching form.

The liquid fuel guidance groove 41 may be installed in the subject placement face 39 of the cover 37.

As shown in FIGS. 5(A) and 5(B), a plurality of air inlets 42b and air outlets 36b are installed at specific intervals in the upper gasket 40b in a peripheral direction thereof, the air outlets 36b are drawn from the respective air inlets 42b toward the inside of the gasket 40, an air guidance groove 41b is concavely formed in the cover placement face 38 of the ring-shaped wall 14 in a peripheral direction thereof, the respective air inlets 42b are made to communicate with the opening of the air guidance groove 41b, and the air 3 supplied to the air guidance groove 41b is flowed out from the air outlets 36b to the air-fuel mixing chamber 12 through the respective air inlets 42b.

The respective air inlets 42b are made to communicate with the opening of the air guidance groove 41b through the air inlets 42a of the lower gasket 40a.

Accordingly, the ring-shaped wall 14 can be easily processed as compared with the case in which an air guidance passage or an air outlet is formed in the ring-shaped wall 14.

As shown in FIG. 6(C), the respective air inlets 42b and the respective air outlets 36b are formed in the upper gasket 40b made of metal in a punching form.

The air guidance groove 41b may be installed in the subject placement face 39 of the cover 37.

FIGS. 6(A) to 6(C) show plan views of the ring-shaped wall 14, the lower gasket 40a, and the upper gasket 40b, respectively.

Figure 7:
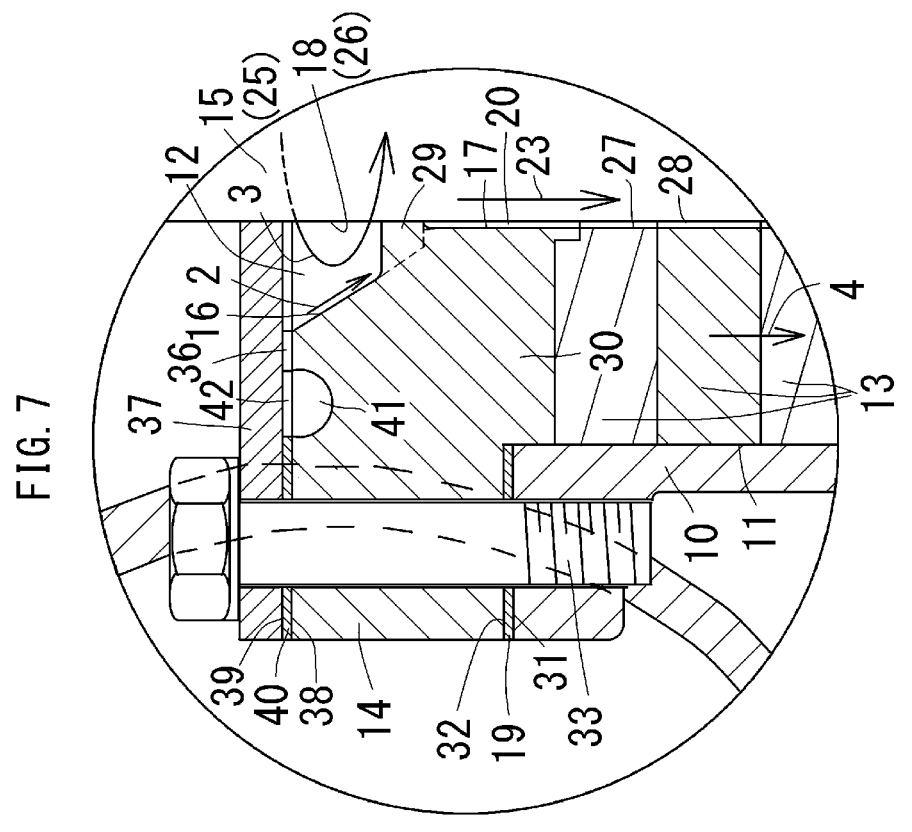

FIGS. 7 and 8 are diagrams illustrating modification examples of the supply structures for the liquid fuel, etc. to the air-fuel mixing chamber.

FIGS. 7 and 8(A) and 8(B) correspond to a first modification example. The gasket 40 includes only a sheet. The plurality of liquid fuel inlets 42 and the liquid fuel outlets 36 are formed at specific intervals in the gasket 40 in a peripheral direction thereof, the liquid fuel outlets 36 are drawn from the respective liquid fuel inlets 42 to the inside of the gasket 40, the liquid fuel guidance groove 41 is concavely formed in the cover placement face 38 of the ring-shaped wall 14 in a peripheral direction thereof, the respective liquid fuel inlets 42 are made to communicate with the opening of the liquid fuel guidance groove 41, and the liquid fuel 2 supplied to the liquid fuel guidance groove 41 is drawn from the liquid fuel outlets 36 to the air-fuel mixing chamber 12 through the respective liquid fuel inlets 42.

As shown in FIG. 8(A), the liquid fuel inlets 42 and the liquid fuel outlets 36 are formed in the gasket 40 in a punching form.

An air ejection port 24 is formed in the ring-shaped wall 14, the air 3 is ejected from the air ejection port 24 to the air-fuel mixing chamber 12 in a tangent direction and then circulated within the air-fuel mixing chamber 12 along the inner peripheral surface 16 of the ring-shaped wall 14.

FIGS. 8(C) and 8(D) correspond to a second modification example. The liquid fuel guidance groove 41 is formed in the subject placement face 39 of the cover 37.

As shown in FIG. 8(C), the liquid fuel 2 is introduced from a liquid fuel supply port 64 to a predetermined liquid fuel inlet 42 communicating with the liquid fuel supply port 64, and the liquid fuel 2 is flowed out from the liquid fuel outlet 36, drawn from the predetermined liquid fuel inlet 42, to the air-fuel mixing chamber 12 and also introduced to the liquid fuel guidance groove 41 through the predetermined liquid fuel inlet 42. As shown in FIG. 8(D), the liquid fuel 2 is distributed from the liquid fuel guidance groove 41 over the other liquid fuel inlets 42 and then flowed out from the respective liquid fuel outlets 36 to the air-fuel mixing chamber 12.

In the second modification example, when the regeneration of the DPF 5 is finished and the supply of the liquid fuel 2 to the liquid fuel guidance groove 41 is stopped, the liquid fuel 2 is flowed out from the liquid fuel guidance groove 41 to the air-fuel mixing chamber 12 through the liquid fuel inlets 42 and the liquid fuel outlets 36 by self-weight. Accordingly, the liquid fuel 2 does not remain in the liquid fuel guidance groove 41, and the clogging of the liquid fuel guidance groove 41 due to the carbonization of the liquid fuel 2 can be suppressed.

The first modification example and the second modification example regarding the supply of the liquid fuel 2 may be applied to the supply of the air 3, only the air 3 may be flowed out from the gasket 40b to the air-fuel mixing chamber 12 by using only one sheet of the gasket 40b shown in FIG. 6(C), and the liquid fuel 2 may be flowed out from portions other than the gasket to the air-fuel mixing chamber 12.

Other structures of the first and the second modification examples shown in FIGS. 7 and 8(A) to 8(D) are the same as those of the embodiments shown in FIGS. 5 and 6. In the drawings, the same elements are assigned the same reference numerals.

As shown in FIGS. 3(A) and 3(B), FIGS. 4(A) and 4(B), and FIG. 7, the inner peripheral surface 16 of the ring-shaped wall 14 has a taper form in which the diameter of the inner peripheral surface 16 is reduced toward a terminal end portion, the plurality of liquid fuel outlets 36 is formed at specific intervals along the upper circumferential portion of the inner peripheral surface 16 of the ring-shaped wall 14 in a peripheral direction thereof, and the liquid fuel 2 flowed out from the respective liquid fuel outlets 36 is made to flow by self-weight along the inner peripheral surface 16 of the ring-shaped wall 14.

Accordingly, the plurality of flows of the liquid fuel 2 flowing along the inner peripheral surface 16 of the ring-shaped wall 14 comes into contact with the air 3, thus becoming the air-fuel mixture gas 23. Thus, a concentration distribution of the air-fuel mixture gas 23 can become uniform and the generation of the combustible gas 4 can be accelerated.

Furthermore, the air-fuel mixture gas 23 can be formed without a hindrance because the liquid fuel 2 flows along the inner peripheral surface 16 of the ring-shaped wall 14 by self-weight even when the combustible gas generator 1 is inclined.

The supply structure for the combustible gas to the exhaust gas is as follows.

As shown in FIG. 2, a secondary air mixing chamber 44 is made to communicate with the combustible gas generation catalyst chamber 11, a combustion catalyst chamber 45 is made to communicate with the secondary air mixing chamber 44 through a secondary air mixing gas outlet 61, a combustion catalyst 46 is accommodated in the combustion catalyst chamber 45, the combustible gas discharge port 6 is made to communicate with the combustion catalyst chamber 45, and the combustible gas 4 and secondary air 48 are supplied from the combustible gas generation catalyst chamber 11 and a secondary air supply source 47 to the secondary air mixing chamber 44. Accordingly, the combustible gas 4 and the secondary air 48 are mixed in the secondary air mixing chamber 44, thus becoming a secondary air mixing gas 49. When the secondary air mixing gas 49 passes through the combustible catalyst 46, part of the combustible gas 4 is subjected to catalyst combustion by means of the secondary air 48, the temperature of the remainder of the combustible gas 4 passing through the combustion catalyst 46 is raised by heat of the combustion, and the combustible gas 4 having a raised temperature is discharged from the combustible gas discharge port 6 to an exhaust passage 7.

Accordingly, the combustible gas 4 can be burnt by oxygen within the exhaust gas 8 because the combustible gas 4 is ignited even when the exhaust gas 8 has a low temperature.

The combustion catalyst 46 is an oxidation catalyst. The secondary air supply source 47 is an air cleaner like the air supply source 47.

The compartment structure of the secondary air mixing chamber of the combustible gas generator is as follows.

Figure 9B:
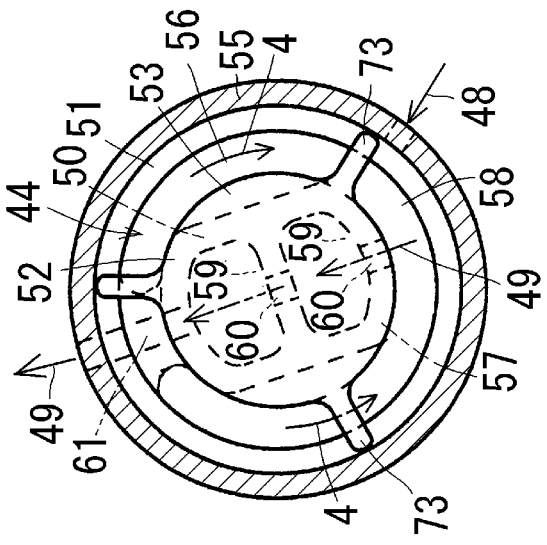
FIG. 9(B) is a diagram of modification example, corresponding to FIG. 9(A)
Figure 9A:
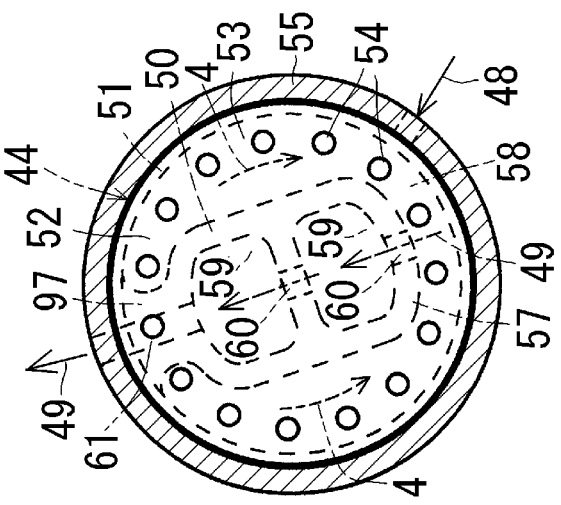
FIG. 9(A) is a cross-sectional view taken along line IXA-IXA in FIG. 2

As shown in FIG. 9(A), compartment plate placement faces 50 and 51 are formed in the terminal end portion (bottom end portion) of the combustible gas generation catalyst chamber 11, a compartment plate 52 is placed in and fixed to the compartment plate placement faces 50 and 51, the secondary air mixing chamber 44 is comparted (i.e., separated) and formed on the terminal end portion (bottom end portion) of the combustible gas generation catalyst chamber 11 by the compartment plate 52, a plurality of combustible gas outlet holes 54 maintained at specific intervals in the circumferential portion 53 of the compartment plate 52 in a peripheral direction thereof is opened, and the combustible gas 4 generated by using the combustible gas generation catalyst 13 is supplied to the secondary air mixing chamber 44 through the combustible gas outlet holes 54.

Accordingly, the secondary air mixing chamber 44 can be formed simply and easily.

Furthermore, the air-fuel mixture gas 23 introduced into the center portion of the combustible gas generation catalyst 13 through the air-fuel mixture gas supply throttle gap 20 passes through the combustible gas generation catalyst 13 without an inclination toward the plurality of combustible gas outlet holes 54 in the circumferential portion 53 of the compartment plate 52 placed in the terminal end portion of the combustible gas generation catalyst chamber 11. Accordingly, the combustible gas 4 can be efficiently generated.

The compartment plate placement face 50 of the two compartment plate placement faces 50 and 51 is the top end face of a ring-shaped compartment wall 57 to be described later, and the other compartment plate placement face 51 thereof is formed along the inner circumference of the ventricular wall 55 of the secondary air mixing chamber 44.

FIG. 9(B) is a modification example of the compartment structure of the secondary air mixing chamber. A combustible gas outlet gap 56 is formed along the circumferential portion 53 of the compartment plate 52 between the circumferential portion 53 of the compartment plate 52 and the ventricular wall 55 of the secondary air mixing chamber 44, and the combustible gas 4 generated by using the combustible gas generation catalyst 13 is supplied to the secondary air mixing chamber 44 through the combustible gas outlet gap 56.

The compartment plate 52 includes three protrusions 73 protruded in a radial direction, and the front ends of the three protrusions 73 come into contact with the ventricular wall 55 of the secondary air mixing chamber 44, so that the movement of the compartment plate 52 in a diameter direction thereof is suppressed.

As shown in FIGS. 9(A) and 9(B), a ring-shaped compartment wall 57 is installed at the center portion of the secondary air mixing chamber 44, a secondary air confluence chamber 58 on the circumference of the ring-shaped compartment wall 57 and secondary air mixing gas expansion chambers 59 and 59 within the ring-shaped compartment wall 57 are comparted (i.e., separated) by the ring-shaped compartment wall 57, the upper opening portions of the secondary air mixing gas expansion chambers 59 and 59 are closed by the compartment plate 52, a throttle hole 60 is opened at the inlet of the secondary air mixing gas expansion chamber 59, a secondary air mixing gas outlet 61 is opened at the outlet of the secondary air mixing gas expansion chamber 59, and the combustible gas 4 and the secondary air 48 are supplied from the combustible gas generation catalyst chamber 11 and the secondary air supply source 47 to the secondary air confluence chamber 58. Accordingly, the secondary air mixing gas 49 formed by joining the combustible gas 4 and the secondary air 48 in the secondary air confluence chamber 58 is formed, the secondary air mixing gas 49 is throttled by the throttle holes 60 and then spread while being expanded in the secondary air mixing gas expansion chamber 59, and the secondary air mixing gas 49 is supplied to the combustion catalyst 46 via the secondary air mixing gas outlet 61.

Accordingly, the secondary air confluence chamber 58 and the secondary air mixing gas expansion chamber 59 can be formed simply and easily.

Furthermore, catalyst combustion in the combustion catalyst 46 can be efficiently performed because a concentration distribution of the secondary air mixing gas 49 supplied to the combustion catalyst 46 becomes uniform.

The structure of the exhaust pipe is as follows.

As shown in FIG. 1, the exhaust pipe 66 is mounted on an exhaust pipe mounting place 65 in the exhaust path, and the DPF casing 67 in which the DPF 5 is accommodated is disposed in the lower stream of the exhaust pipe 66. As shown in FIG. 2, an exhaust outlet passage 68 and a strained unit 69 protruded from the exhaust outlet passage 68 outwardly in the diameter direction of the exhaust outlet passage 68 are installed in the exhaust pipe mounting place 65, the passage starting end portion 71 of the exhaust passage 7 and the passage terminal end portion 74 of a combustible gas guidance passage 70 are installed in parallel in the exhaust pipe 66, the central axial line 71a of the passage starting end portion 71 of the exhaust passage 7 complies with the central axial line 68a of the exhaust outlet passage 68, and the passage central axial line 74a of the passage terminal end portion 74 of the combustible gas guidance passage 70 opens the combustible gas discharge port 6 at the boundary of the passage terminal end portion 74 of the combustible gas guidance passage 70 and the passage starting end portion 71 of the exhaust passage 7 toward the strained unit 69.

Accordingly, the combustible gas 4 flowing along the passage axial line 74a of the passage terminal end portion 74 of the combustible gas guidance passage 70 toward the strained unit 69 does not directly come into contact with the exhaust gas 8 passing through the exhaust passage 7, but the combustible gas 4 is gently discharged from the combustible gas discharge port 6 to the passage starting end portion 71 of the exhaust passage 7. For this reason, back pressure can become small because a deviation in the flow of the exhaust gas 8 by the combustible gas 4 is suppressed.

Furthermore, as shown in FIG. 12, the exhaust pipe 66 that is bent or straight on the side of the passage terminal end 63 of the exhaust passage 7 can be selectively used, and a deviation in the exhaust gas 8 is suppressed even when the arrangement of the DPF casing 67 is changed. Accordingly, a difference in back pressure due to the difference of the shape of the exhaust pipe 66 is small and a constant exhaust gas performance is assured. For this reason, the degree of freedom in the arrangement of the DPF casing 67 can be increased by changing a shape on the side of the passage terminal end portion 63 of the exhaust pipe 66.

As shown in FIG. 2, the exhaust pipe mounting place of the exhaust turbine 76 of the super charger 75 is used as the exhaust pipe mounting place 65, the exhaust outlet passage of the exhaust turbine 76 is used as the exhaust outlet passage 68, and the waste gate valve 77 of the exhaust turbine 76 and a valve mounting unit 78 thereof are used as the strained unit 69.

Accordingly, the exhaust pipe 66 can be mounted by using the super charger 77.

As shown in FIG. 2, the outlet-side end face 79 of the combustion catalyst 46 is spaced apart from the combustible gas discharge port 6 toward the starting end side of the combustible gas guidance passage 70.

This makes it difficult for the exhaust gas 8 to come into contact with the combustion catalyst 46 even when the exhaust gas 8 enters from the combustible gas discharge port 6 to the combustible gas guidance passage 70 by the pulsation of the exhaust gas 8. Accordingly, a problem that the combustible gas 4 is unnecessarily burnt by the combustion catalyst 46 owing to oxygen within the exhaust gas 8 can be suppressed, and thermal damage to the combustion catalyst 46 resulting from the unnecessary combustion can be prevented.

The fixing structure of the combustible catalyst is as follows.

As shown in FIG. 10(A), a secondary air mixing gas inlet chamber 81 is formed between the secondary air mixing gas outlet 61 of the secondary air mixing chamber 44 and the combustion catalyst chamber 45, combustion catalyst reception means 82 and combustion catalyst leakage prevention means 83 are installed in the secondary air mixing gas inlet chamber 81 and the combustion catalyst chamber 45, and the combustion catalyst 46 is put in the combustion catalyst chamber 45 from the passage terminal end portion 74 of the combustible gas guidance passage 70 toward the secondary air mixing gas inlet chamber 81. Accordingly, the movement of the combustion catalyst 46 toward the secondary air mixing gas inlet chamber 81 is received in the combustion catalyst reception means 82, the leakage of the combustion catalyst 46 toward the passage terminal end portion 74 of the combustible gas guidance passage 70 is prevented by the combustion catalyst leakage prevention means 83, and the combustion catalyst 46 is fixed to the catalyst combustion chamber 45.

Accordingly, the combustion catalyst 46 can be easily fixed to the catalyst combustion chamber 45.

As shown in FIG. 10(A), the inner peripheral surface 88 of the secondary air mixing gas inlet chamber 81 has a taper form in which the inner peripheral surface 88 is enlarged and opened from the secondary air mixing gas outlet 61 toward the combustion catalyst chamber 45, and the inner peripheral surface 88 of the secondary air mixing gas inlet chamber 81 is used as the combustion catalyst reception means 82.

Accordingly, the secondary air mixing gas 49 flowed out from the secondary air mixing gas outlet 61 is widely diffused in the secondary air mixing gas inlet chamber 81 toward the inlet-side end face 80 of the combustion catalyst 46 and then introduced from the entire area of the inlet-side end face 80 of the combustion catalyst 46 to the combustion catalyst 46 smoothly. Accordingly, the combustible gas 4 within the secondary air mixing gas 49 can be efficiently burnt over the entire area of the combustion catalyst 46. Furthermore, it is not necessary to specially install the combustion catalyst reception means 82.

As shown in FIGS. 10(A) and 10(B), in opening a sensor insertion hole 86 in the passage wall 85 of the combustible gas guidance passage 70 and inserting a combustible catalyst outlet-side temperature sensor 87 from the sensor insertion hole 86 to the combustible gas guidance passage 70 so that the sensor temperature sensing unit 89 of the combustion catalyst outlet-side temperature sensor 87 faces the outlet-side end face 79 of the combustion catalyst 46, a pipe 90 is inserted into the sensor insertion hole 86, the combustion catalyst outlet-side temperature sensor 87 is inserted into the pipe 90 so that the combustion catalyst outlet-side temperature sensor 87 passes through the pipe 90, a sensor temperature sensing unit 89 is protruded from the insertion-side end 91 of the pipe 90, and the outlet-side end face 79 of the combustion catalyst 46 is received in the outer peripheral surface 92 of the insertion-side end 91 of the pipe 90. Accordingly, the insertion-side end 91 of the pipe 90 is used as the combustion catalyst leakage prevention means 83, and the sensor temperature sensing unit 89 of the combustion catalyst outlet-side temperature sensor 87 is spaced apart from the outlet-side end face 79 of the combustion catalyst 46 by means of the insertion-side end 91 of the pipe 90.

Accordingly, a new insertion hole for mounting the leakage prevention means 83 on the passage wall 85 of the combustible gas guidance passage 70 needs not to be formed. Furthermore, a problem that heat is directly inputted from the outlet-side end face 79 of the combustion catalyst 46 to the sensor temperature sensing unit 89 or a problem that the outlet-side end face 79 of the combustion catalyst 46 comes into contact with the sensor temperature sensing unit 89 owing to a vibration of the engine can be prevented. Accordingly, damage to the sensor temperature sensing unit 89 of the combustion catalyst outlet-side temperature sensor 87 can be prevented.

As shown in FIG. 10(B), when the sensor insertion hole 86 is processed by drilling, the passage wall 85 of the combustible gas guidance passage 70 is left in part of the inner end of the sensor insertion hole 86 and used as the pipe reception unit 93, and part of the insertion-side end face 94 of the pipe 90 is received in the pipe reception unit 93.

Accordingly, since the pipe 90 does not unnecessarily enter the combustible gas guidance passage 70, a problem that the sensor temperature sensing unit 89 of the combustion catalyst outlet-side temperature sensor 87 is covered at the insertion-side end 91 of the pipe 90 can be prevented.

FIGS. 10(C) to 10(F) show modification examples of the fixing structure of the combustion catalyst.

A first modification example shown in FIG. 10(C) shows that an adiabatic cushion material 96 is interposed between the combustion catalyst 46 and the ventricular wall 62 of the combustion catalyst chamber 45, in the embodiments shown in FIGS. 10(A) and 10(B). The adiabatic cushion material 96 is a sheet of glass wool.

A second modification example shown in FIG. 10(D) shows that the adiabatic cushion material 96 is interposed between the combustion catalyst chamber 45 and the combustion catalyst 46, the adiabatic cushion material 96 is rubbed against and fixed to the ventricular wall 62 of the combustion catalyst chamber 45, and the combustion catalyst 46 is rubbed against and fixed to the adiabatic cushion material 96 so that the adiabatic cushion material 96 is used as the combustion catalyst leakage prevention means 83.

In the first modification example and the second modification example shown in FIGS. 10(C) and 10(D), the catalyst activity and durability of the combustion catalyst 46 can be increased because a reduction in the temperature of the combustion catalyst 46 or an impact to the combustion catalyst 46 can be avoided by the adiabatic cushion material 96.

In a third modification example shown in FIG. 10(E), a snap ring 98 is inwardly inserted into and fixed to the outlet of the combustion catalyst chamber 45, and the snap ring 98 is used as the combustion catalyst leakage prevention means 83.

In a fourth modification example shown in FIG. 10(F), a sleeve 99 is press-fit from the passage terminal end portion 74 of the combustible gas guidance passage 70 toward the combustion catalyst chamber 45, the sleeve 99 is rubbed against and fixed to the passage wall 85 of the combustible gas guidance passage 70, and the sleeve 99 is used as the combustion catalyst leakage prevention means 83. A sensor insertion pass hole 99a is formed in the sleeve 99, and the sensor temperature sensing unit 89 of the combustion catalyst outlet-side temperature sensor 87 is protruded into the sleeve 99 from the sensor insertion pass hole 99a.

In the third modification example and the fourth modification example shown in FIGS. 10(E) and 10(F), the combustion catalyst 46 can be robustly fixed in the catalyst combustion chamber 45.

As shown in FIG. 2, the ventricular wall 95 of the secondary air mixing gas inlet chamber 81, the ventricular wall 55 of the secondary air mixing chamber 44, and the ring-shaped compartment wall 57 are integrated into a molding product. Furthermore, the secondary air mixing gas outlet 61 penetrating a boundary wall 97 between the secondary air mixing gas inlet chamber 81 and the secondary air mixing gas expansion chamber 59 and the throttle holes 60 and 60 penetrating the ring-shaped compartment wall 57 are formed by a series of straight drilling processes from the passage terminal end portion 74 of the combustible gas guidance passage 70 toward the secondary air confluence chamber 58 via the secondary air mixing gas inlet chamber 81 and the secondary air mixing gas expansion chamber 59.

Accordingly, the secondary air mixing gas outlet 61 and the throttle holes 60 and 60 can be formed simply and easily.

The construction of the exhaust path and control of the generation of the combustible gas are as follows.

An engine ECU 102 shown in FIG. 1 includes PM accumulation amount estimation means 101 and PM regeneration control means 111. The engine ECU is an abbreviation of an engine electronic control unit.

The PM accumulation amount estimation means 101 is a specific operation unit of the engine ECU 102 that estimates a PM accumulation amount from map data which is experimentally calculated in advance on the basis of an engine load, the number of rotations of the engine, an exhaust gas temperature detected by a DPF upper stream-side exhaust temperature sensor 103, a DPF (5) upper stream-side exhaust gas pressure by a DPF upper stream-side exhaust gas pressure sensor 104, and a difference in the pressure between the upper stream and the lower stream of the DPF 5 by a difference pressure sensor 105.

When a PM accumulation amount estimation value estimated by the PM accumulation amount estimation means 101 reaches a specific regeneration desired value, the PM regeneration control means 111 heats the heater 25 and drives a liquid fuel pump 107, an air supply pump 108, and a secondary air supply pump 109. Accordingly, the liquid fuel 2 and the air 3 are supplied to the air-fuel mixing chamber 12, the combustible gas 4 is generated by using the combustible gas generation catalyst 13, the secondary air mixing gas 49 is formed in the secondary air mixing chamber 44, a temperature of the combustible gas 4 is raised by the combustion catalyst 46, and the combustible gas 4 having a raised temperature is discharged from the combustible gas discharge port 6 to the exhaust passage 7 in the upper stream of the DPF 5.

The PM regeneration control means 111 meters the amount of the liquid fuel supplied by the liquid fuel pump 107 or the amount of the air supplied by the air pump 108 on the basis of a temperature of the combustible gas generation catalyst 13, detected by the combustible gas generation catalyst temperature sensor 106, and meters the amount of the secondary air supplied by the secondary air pump 109 on the basis of a temperature of the combustible gas 4 on the outlet side of the combustion catalyst 46, detected by the combustion catalyst outlet-side temperature sensor 87.

When a temperature of the exhaust gas 8 on the upper stream side of the DOC 100 detected by a DOC upper stream-side exhaust temperature sensor 110 is lower than an activation temperature of the DOC 100, the PM regeneration control means 111 meters the amount of the secondary air supplied by the secondary air pump 109, raises a temperature of the combustible gas 4, and raises a temperature of the exhaust gas 12 in order to activate the DOC 10.

When a temperature of the exhaust gas detected by a DPF lower stream-side exhaust gas temperature sensor 112 reaches a specific abnormal temperature, the PM regeneration control means 111 stops the supply of the combustible gas 4 to the exhaust gas 8.

When the combustible gas 4 first starts being generated, the heater 25 is heated for a specific time. When the generation of the combustible gas 4 is started, however, a temperature of the combustible gas generation catalyst 13 is raised by an exothermic reaction. Accordingly, if a predetermined period of time elapses after the generation of the combustible gas 4 is started, the generation of heat of the heater 25 is stopped by a timer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An exhaust gas treatment device of a diesel engine, the device comprising:
   a combustible gas generator (1) for generating a combustible gas (4), a combustible gas discharge port (6) connected to the combustible gas generator (1) for discharging the combustible gas (4) to an exhaust passage (7) upstream of a DPF (5), the combustible gas (4) being burnt by oxygen within an exhaust gas (8), a temperature of the exhaust gas (8) being raised by heat of the combustion, and a PM accumulated in the DPF (5) being burnt and removed by heat of the exhaust gas (8),
   a combustible gas generation catalyst chamber (11) installed in the combustible gas generator (1), a combustible gas generation catalyst (13) accommodated in the combustible gas generation catalyst chamber (11), a ring-shaped wall (14) disposed in a starting end portion of the combustible gas generation catalyst chamber (11), an air-fuel mixing chamber (12) formed on an inside of the ring-shaped wall (14), wherein air (3) and liquid fuel (2) are supplied to the air-fuel mixing chamber (12) so that an air-fuel mixture gas (23) is formed in the air-fuel mixing chamber (12), the air-fuel mixture gas (23) is supplied to the combustible gas generation catalyst (13), and the combustible gas (4) is generated by using the combustible gas generation catalyst (13),
   a core material (15) inwardly inserted into a center portion of the ring-shaped wall (14) so that the air-fuel mixing chamber (12) is formed between an inner peripheral surface (16) of the ring-shaped wall (14) and an outer peripheral surface (18) of the core material (15), and the air-fuel mixture gas (23) of the air-fuel mixing chamber (12) is supplied from a terminal end portion of the air-fuel mixing chamber (12) to a portion near a center portion of the combustible gas generation catalyst (13), and
   a heat-dissipating outer peripheral surface (26) of a heater (25) being exposed to the air-fuel mixing chamber (12) by using the heater (25) as the core material (15), and when the combustible gas (4) starts being generated, heat is directly radiated from the heat-dissipating outer peripheral surface (26) of the heater (25) to the air-fuel mixing chamber (12).

2. The exhaust gas treatment device according to claim 1, wherein:
   an air-fuel mixture gas inlet face (27) is formed on an inner circumference of the combustible gas generation catalyst (13) of an annular form, the core material (15) is inwardly inserted into the center portion of the combustible gas generation catalyst (13) so that an air-fuel mixture gas introduction gap (28) is formed between the air-fuel mixture gas inlet face (27) and the outer peripheral surface (18) of the core material (15) and the air-fuel mixture gas (23) of the air-fuel mixing chamber (12) is introduced from the terminal end portion of the air-fuel mixing chamber (12) to the air-fuel mixture gas inlet face (27) near the center portion of the combustible gas generation catalyst (13) through the air-fuel mixture gas introduction gap (28), and
   a heat-dissipating outer peripheral surface (26) of the heater (25) used as the core material (15) is exposed to the air-fuel mixture gas introduction gap (28) so that, when the combustible gas (4) starts being generated, the heat is directly radiated from the heat-dissipating outer peripheral surface (26) of the heater (25) to the air-fuel mixture gas introduction gap (28).

3. The exhaust gas treatment device according to claim 1, wherein:
   an air-fuel mixture gas supply throttle part (17) is installed in a terminal end portion of the inner peripheral surface (16) of the ring-shaped wall (14), and an air-fuel mixture gas supply throttle gap (20) is formed between the air-fuel mixture gas supply throttle part (17) and the outer peripheral surface (18) of the core material (15), and
   a spacer protrusion (29) is formed in one (16) of the inner peripheral surface (16) of the ring-shaped wall (14) and the outer peripheral surface (18) of the core material (15), and the spacer protrusion (29) is brought in contact with the other (18) thereof,
   whereby the inner peripheral surface (16) of the ring-shaped wall (14) and the outer peripheral surface (18) of the core material (15) are mutually positioned and the air-fuel mixture gas supply throttle part (17) and the outer peripheral surface (18) of the core material (15) are also mutually positioned, through the spacer protrusion (29).

4. The exhaust gas treatment device according to claim 2, wherein:

an air-fuel mixture gas supply throttle part (17) is installed in a terminal end portion of the inner peripheral surface (16) of the ring-shaped wall (14), and an air-fuel mixture gas supply throttle gap (20) is formed between the air-fuel mixture gas supply throttle part (17) and the outer peripheral surface (18) of the core material (15), and a spacer protrusion (29) is formed in one (16) of the inner peripheral surface (16) of the ring-shaped wall (14) and the outer peripheral surface (18) of the core material (15), and the spacer protrusion (29) is brought in contact with the other (18) thereof, the inner peripheral surface (16) of the ring-shaped wall (14) and the outer peripheral surface (18) of the core material (15) are mutually positioned and the air-fuel mixture gas supply throttle part (17) and the outer peripheral surface (18) of the core material (15) are also mutually positioned, through the spacer protrusion (29), and the combustible gas generation catalyst (13) of an annular form is inwardly inserted into the combustible gas generation catalyst chamber (11) so that a position adjustment protrusion unit (30) is installed in a terminal end portion of the ring-shaped wall (14), and the position adjustment protrusion unit (30) is inwardly inserted into a starting end portion of a circumferential wall (10) of the combustible gas generation catalyst chamber (11) so that an air-fuel mixture gas inlet face (27) of the combustible gas generation catalyst (13) and the outer peripheral surface (18) of the core material (15) are mutually positioned through the circumferential wall (10) of the combustible gas generation catalyst chamber (11), the ring-shaped wall (14), and the spacer protrusion (29).

5. The exhaust gas treatment device according to claim 1, wherein:

in forming a ring-shaped placement face (31) in a starting end portion of a circumferential wall (10) of the combustible gas generation catalyst chamber (11), forming a subject placement face (32) in a terminal end portion of the ring-shaped wall (14), and placing and fixing the subject placement face (32) of the ring-shaped wall (14) in and to the placement face (31), a position adjustment protrusion unit (30) placed more inwardly than the subject placement face (32) is formed in the terminal end portion of the ring-shaped wall (14), and a position adjustment protrusion unit (30) is inwardly inserted into the starting end portion of the circumferential wall (10) of the combustible gas generation catalyst chamber (11).

6. The exhaust gas treatment device according to claim 5, wherein:

in placing and fixing the subject placement face (32) of the ring-shaped wall (14) in and to the placement face (31) of the combustible gas generation catalyst chamber (11) by means of fastening force of a mounting bolt (33) and accommodating the combustible gas generation catalyst (13) on an inside of the position adjustment protrusion unit (30), an adiabatic space (34) is formed in the position adjustment protrusion unit (30) between the combustible gas generation catalyst (13) and the mounting bolt (33).

7. The exhaust gas treatment device according to claim 6, wherein:

the adiabatic space (34) is concavely formed in an outer peripheral surface of the position adjustment protrusion unit (30), a sealant (35) is placed in the adiabatic space (34), and the sealant (35) is sealed between the position adjustment protrusion unit (30) and the circumferential wall (10) of the combustible gas generation catalyst chamber (11), a gasket is unnecessary between the placement face (31) of the combustible gas generation catalyst chamber (11) and the subject placement face (32) of the ring-shaped wall (14).

8. The exhaust gas treatment device according to claim 1, wherein:

a cover (37) is placed in a starting end portion of the ring-shaped wall (14), a ring-shaped cover placement face (38) is installed in the starting end portion of the ring-shaped wall (14), a subject placement face (39) is placed in a terminal end portion of the cover (37), and the subject placement face (39) of the cover (37) is placed in and fixed to the cover placement face (38) of the ring-shaped wall (14) with a ring-shaped gasket (40) interposed therebetween, a plurality of liquid fuel inlets (42) and liquid fuel outlets (36) are formed at specific intervals in the gasket (40) in a peripheral direction thereof, and the liquid fuel outlets (36) are drawn from the respective liquid fuel inlets (42) toward an inside of the gasket (40), and a liquid fuel guidance groove (41) is concavely formed in any one of the cover placement face (38) of the ring-shaped wall (14) and the subject placement face (39) of the cover (37) in a peripheral direction thereof, the liquid fuel inlets (42) are made to communicate with an opening of the liquid fuel guidance groove (41), and the liquid fuel (2) supplied to the liquid fuel guidance groove (41) is flowed out from the liquid fuel outlets (36) to the air-fuel mixing chamber (12) through the liquid fuel inlets (42).

9. The exhaust gas treatment device according to claim 1, wherein:

a cover (37) is placed in a starting end portion of the ring-shaped wall (14), a ring-shaped cover placement face (38) is installed in the starting end portion of the ring-shaped wall (14), a subject placement face (39) is placed in a terminal end portion of the cover (37), and the subject placement face (39) of the cover (37) is placed in and fixed to the cover placement face (38) of the ring-shaped wall (14) with a ring-shaped gasket (40) interposed therebetween, a plurality of air inlets (42b) and air outlets (36b) are formed at specific intervals in the gasket (40) in a peripheral direction thereof, and the air outlets (36)b are drawn from the respective air inlets (42b) toward the inside of the gasket (40), and an air guidance groove (41b) is concavely formed in any one of the cover placement face (38) of the ring-shaped wall (14) and the subject placement face (39) of the cover (37) in a peripheral direction thereof, the air inlets (42b) are made to communicate with an opening of the air guidance groove (41b), and the air (3) supplied to the air guidance groove (41b) is flowed out from the air outlets (36b) to the air-fuel mixing chamber (12) through the air inlets (42b).

10. The exhaust gas treatment device according to claim 1, wherein:

the inner peripheral surface (16) of the ring-shaped wall (14) has a taper form in which a diameter of the inner peripheral surface (16) is reduced toward a lower terminal end portion, and a plurality of liquid fuel outlets (36) is formed at specific intervals along the upper circumferential portion of the inner peripheral surface (16) of the ring-shaped wall (14)

in a peripheral direction thereof, and the liquid fuel (2) flowed out from the liquid fuel outlets (36) is made to flow by self-weight along the inner peripheral surface (16) of the ring-shaped wall (14).

11. The exhaust gas treatment device according to claim 1, wherein:
    a secondary air mixing chamber (44) is made to communicate with the combustible gas generation catalyst chamber (11), a combustion catalyst chamber (45) is made to communicate with the secondary air mixing chamber (44), a combustion catalyst (46) is accommodated in the combustion catalyst chamber (45), and the combustible gas discharge port (6) is made to communicate with the combustion catalyst chamber (45), and
    the combustible gas (4) and secondary air (48) are supplied from the combustible gas generation catalyst chamber (11) and a secondary air supply source (47) to the secondary air mixing chamber (44),
    whereby the combustible gas (4) and the secondary air (48) are mixed in the secondary air mixing chamber (44), thus becoming a secondary air mixing gas (49), and when the secondary air mixing gas (49) passes through the combustion catalyst (46), part of the combustible gas (4) is subject to catalyst combustion by means of the secondary air (48), a temperature of the remainder of the combustible gas (4) passing through the combustion catalyst (46) is raised by heat of the combustion, and the combustible gas (4) having a raised temperature is discharged from the combustible gas discharge port 6 to the exhaust passage (7).

12. The exhaust gas treatment device according to claim 11, wherein:
    compartment plate placement faces (50), (51) are formed in a terminal end portion of the combustible gas generation catalyst chamber (11), a compartment plate (52) is placed in and fixed to the compartment plate placement faces (50), (51), and the secondary air mixing chamber (44) is separated and formed on a terminal end side of the combustible gas generation catalyst chamber (11) by the compartment plate (52), and
    a plurality of combustible gas outlet holes (54) maintained at specific intervals in a circumferential portion (53) of the compartment plate (52) in a peripheral direction thereof is opened, and the combustible gas (4) generated by using the combustible gas generation catalyst (13) is supplied to the secondary air mixing chamber (44) through the combustible gas outlet holes (54).

13. The exhaust gas treatment device according to claim 11, wherein:
    compartment plate placement faces (50), (51) are formed in a terminal end portion of the combustible gas generation catalyst chamber (11), a compartment plate (52) is placed in and fixed to the compartment plate placement faces (50), (51), and the secondary air mixing chamber (44) is separated and formed on a terminal end side of the combustible gas generation catalyst chamber (11) by the compartment plate (52), and
    a combustible gas outlet gap (56) is formed along the circumferential portion (53) of the compartment plate (52) between the circumferential portion (53) of the compartment plate (52) and a ventricular wall (55) of the secondary air mixing chamber (44), and the combustible gas (4) generated by using the combustible gas generation catalyst (13) is supplied to the secondary air mixing chamber (44) through the combustible gas outlet gap (56).

14. The exhaust gas treatment device according to claim 12, wherein:
    a ring-shaped compartment wall (57) is installed at a center portion of the secondary air mixing chamber (44), a secondary air confluence chamber (58) on a circumference of the ring-shaped compartment wall (57) and secondary air mixing gas expansion chambers (59) on an inside of the ring-shaped compartment wall (57) are separated by the ring-shaped compartment wall (57), openings of the secondary air mixing gas expansion chambers (59) are closed by a compartment plate (52), a throttle hole (60) is opened at an inlet of the secondary air mixing gas expansion chamber (59), and a secondary air mixing gas outlet (61) is opened at an outlet of the secondary air mixing gas expansion chamber (59), and
    the combustible gas (4) and the secondary air (48) are supplied from the combustible gas generation catalyst chamber (11) and the secondary air supply source (47) to the secondary air confluence chamber (58),
    whereby a secondary air mixing gas (49) formed by joining the combustible gas (4) and the secondary air (48) in the secondary air confluence chamber (58) is formed, the secondary air mixing gas (49) is throttled by the throttle holes (60) and then diffused while being expanded in the secondary air mixing gas expansion chamber (59), and the secondary air mixing gas (49) is supplied to the combustion catalyst (46) via the secondary air mixing gas outlet (61).

* * * * *